US010311195B2

(12) United States Patent
Xue et al.

(10) Patent No.: US 10,311,195 B2
(45) Date of Patent: Jun. 4, 2019

(54) INCREMENTAL MULTI-PATTERNING VALIDATION

(71) Applicant: Synopsys, Inc., Mountain View, CA (US)

(72) Inventors: Yuli Xue, Shanghai (CN); Weiping Fang, Fremont, CA (US); John Robert Studders, Raleigh, NC (US); Byungwook Kim, Los Altos Hills, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/996,796

(22) Filed: Jan. 15, 2016

(65) Prior Publication Data

US 2017/0206300 A1 Jul. 20, 2017

(51) Int. Cl.
*G06F 17/50* (2006.01)
*H01L 21/84* (2006.01)
*G03F 1/00* (2012.01)

(52) U.S. Cl.
CPC .......... *G06F 17/5081* (2013.01); *G03F 1/00* (2013.01); *H01L 21/845* (2013.01); *G06F 2217/12* (2013.01); *H01L 21/84* (2013.01); *Y02P 90/265* (2015.11)

(58) Field of Classification Search
CPC ............................ G06F 17/5081; G06F 17/50; G06F 2217/12; G06F 17/5068; G06F 17/5072; G03F 1/22; G03F 1/68; G03F 1/70; G03F 7/70433; G03F 7/70466
USPC .................................. 716/50–55; 430/5, 30
See application file for complete search history.

(56) References Cited

U.S. PATENT DOCUMENTS

| 6,408,428 | B1 | 6/2002 | Schlansker et al. |
| 6,421,809 | B1 | 7/2002 | Wuytack et al. |
| 6,704,921 | B2 | 3/2004 | Liu |
| 6,829,216 | B1 | 12/2004 | Nakata |
| 7,049,589 | B2 | 5/2006 | Yamaguchi et al. |
| 7,114,141 | B1 | 9/2006 | Teig et al. |
| 7,560,201 | B2 | 7/2009 | Liu |

(Continued)

FOREIGN PATENT DOCUMENTS

| WO | WO 14/130783 A1 | 8/2014 |
| WO | WO 15/023856 A1 | 2/2015 |

OTHER PUBLICATIONS

Beigel et al., "3-Coloring in Time 0(1.3289")," Journal of Algorithms, 54:168-204, (2005).

(Continued)

*Primary Examiner* — Nghia M Doan
(74) *Attorney, Agent, or Firm* — Alston & Bird LLP

(57) ABSTRACT

A computer-implemented method for validating a design characterized by a multi-patterning layer is presented. The method includes receiving the multi-patterning layer in a memory of the computer when the computer is invoked to validate the design. The method further includes correcting, using the computer, a first error in a first shape of the multi-patterning layer in accordance with a first rule thereby forming a corrected layer. The method further includes incrementally validating, using the computer, a first portion of the corrected layer in accordance with the first error and a first connected component of a first graph associated with the multi-patterning layer.

23 Claims, 19 Drawing Sheets

(56) References Cited

U.S. PATENT DOCUMENTS

| | | | |
|---|---|---|---|
| 7,647,212 B2 | 1/2010 | Andreoli et al. | |
| 7,653,892 B1 | 1/2010 | Gennari et al. | |
| 8,069,423 B2 | 11/2011 | Ghan et al. | |
| 8,190,547 B2 | 5/2012 | Kirovski | |
| 8,209,656 B1 | 6/2012 | Wang et al. | |
| 8,312,394 B2 | 11/2012 | Ban et al. | |
| 8,316,329 B1 | 11/2012 | Rigby et al. | |
| 8,327,299 B1 | 12/2012 | Gennari | |
| 8,359,556 B1 | 1/2013 | Ghaida et al. | |
| 8,402,396 B2 | 3/2013 | Kahng et al. | |
| 8,434,043 B1 | 4/2013 | Hsu et al. | |
| 8,448,100 B1 | 5/2013 | Lin et al. | |
| 8,473,873 B1 | 6/2013 | Hsu et al. | |
| 8,484,607 B1 | 7/2013 | Tang et al. | |
| 8,515,724 B2 | 8/2013 | Joshi et al. | |
| 8,516,403 B2 | 8/2013 | Abou Ghaida et al. | |
| 8,601,409 B1 | 12/2013 | Chen et al. | |
| 8,661,371 B1 | 2/2014 | Wang | |
| 8,677,297 B2 | 3/2014 | Chase et al. | |
| 8,751,974 B2 * | 6/2014 | Kahng | G03F 1/70 716/110 |
| 8,875,065 B1 * | 10/2014 | Lin | G06F 17/5081 716/52 |
| 9,141,752 B2 | 9/2015 | Lin et al. | |
| 9,158,885 B1 | 10/2015 | Gray et al. | |
| 9,298,084 B2 | 3/2016 | Luo | |
| 9,360,750 B2 | 6/2016 | Lin et al. | |
| 9,384,319 B2 | 7/2016 | Cilingir et al. | |
| 9,740,814 B1 | 8/2017 | Ghosh | |
| 9,904,756 B1 | 2/2018 | Ruehl et al. | |
| 2009/0070550 A1 | 3/2009 | Solomon | |
| 2010/0050146 A1 | 2/2010 | Frankle et al. | |
| 2010/0064269 A1 | 3/2010 | Lai et al. | |
| 2011/0014786 A1 | 1/2011 | Sezginer et al. | |
| 2011/0052088 A1 | 3/2011 | Yuan et al. | |
| 2011/0078638 A1 | 3/2011 | Kahng et al. | |
| 2011/0197168 A1 | 8/2011 | Chen et al. | |
| 2011/0284996 A1 | 11/2011 | Kurusu et al. | |
| 2013/0007674 A1 | 1/2013 | Abou Ghaida et al. | |
| 2013/0024822 A1 | 1/2013 | Hsieh et al. | |
| 2013/0036397 A1 | 2/2013 | Lee et al. | |
| 2013/0061183 A1 | 3/2013 | Abou Ghaida et al. | |
| 2013/0061185 A1 | 3/2013 | Abou Ghaida et al. | |
| 2013/0074018 A1 | 3/2013 | Hsu et al. | |
| 2013/0174106 A1 | 7/2013 | Hsu et al. | |
| 2014/0007026 A1 | 1/2014 | Chen et al. | |
| 2014/0053118 A1 | 2/2014 | Chen et al. | |
| 2014/0189611 A1 | 7/2014 | Lai et al. | |
| 2014/0244215 A1 | 8/2014 | Nakayama et al. | |
| 2014/0245237 A1 * | 8/2014 | Cilingir | G03F 7/70433 716/51 |
| 2014/0282293 A1 | 9/2014 | Lin et al. | |
| 2014/0372958 A1 | 12/2014 | Lin et al. | |
| 2015/0040077 A1 | 2/2015 | Ho et al. | |
| 2015/0234974 A1 | 8/2015 | Dechene et al. | |
| 2015/0286771 A1 * | 10/2015 | Choi | G06F 17/5081 716/51 |
| 2017/0004251 A1 | 1/2017 | Cilingir et al. | |
| 2017/0124242 A1 | 5/2017 | Sharma et al. | |
| 2017/0147740 A1 | 5/2017 | Chang | |
| 2017/0336707 A1 | 11/2017 | Choi et al. | |

OTHER PUBLICATIONS

Dorigo et al., "An Introduction to Ant Colony Optimization," Universite Libre de Bruxelles Institut de Recherches Interdisciplinaires et de Developpements en Intelligence Artificielle (IRIDIA) Technical Report No. TR/IRIDIA/2006-010, 22 pages, (2006).

Fang et al., "A novel layout decomposition algorithm for triple patterning lithography," In IEEE Trans. on Computer-Aided Design of Integrated Circuits and Systems (TCAD), 33(3),:397-408, (2014).

Fister et al., "Using differential evolution for the graph coloring," Differential Evolution (SDE), IEEE, Symposium on Apr. 11, 2011, pp. 1-7, doi: 10.1109/SDE.2011.5952075, (2011).

Galinier et al.; "Hybrid Evolutionary Algorithms for Graph Coloring" Journal of Combinatorial Optimization, Kluwer Academic Publishers, pp. 1-33, (1999).

Grosan et al., "Hybrid Evolutionary Algorithms: Methodologies, Architectures, and Reviews," Studies in Computational Intelligence (SCI), 75:1-17, (2007).

Kuang et al., "An Efficient Layout Decomposition Approach for Triple Patterning Lithography," In: Design Automation Conference (DAC) 2013, pp. 1-6, (2013).

Li et al., "14nm M1 Triple Patterning," Proceedings of the International Society for Optics and Photonics (SPIE), 8326:832612-1—832612-7, (2012).

Tian et al., "A polynomial time triple patterning algorithm for cell based row-structure layout," Computer-Aided Design, pp. 57-64, doi: 10.1145/2429384.2429396 (2012).

Yu et al., "Layout Decomposition for Triple Patterning Lithography," 2011 Institute of Electrical and Electronics Engineers/Association for Computing Machinery International Conference on Computer-Aided Design (ICCAD), pp. 1-8, (2011).

EPO Application No. 14753896.1, European Search Report and European Search Opinion dated Dec. 20, 2016.

Taiwanese Application No. 103105938, First Office Action dated Jun. 5, 2015.

Taiwanese Application No. 103105938, Second Office Action dated Oct. 5, 2015.

U.S. Appl. No. 14/185,717, Final Office Action dated Jan. 13, 2017.

U.S. Appl. No. 14/185,717, Non-Final Office Action dated Apr. 5, 2016.

U.S. Appl. No. 14/459,657, Non-Final Office Action dated Oct. 7, 2015.

U.S. Appl. No. 14/459,657, Notice of Allowance dated Mar. 11, 2016.

U.S. Appl. No. 14/678,831, Final Office Action dated Dec. 23, 2016.

U.S. Appl. No. 14/678,831, Non-Final Office Action dated Apr. 27, 2016.

U.S. Appl. No. 15/179,890, Non-Final Office Action dated Mar. 13, 2017.

WIPO Application No. PCT/US2014/017619, PCT International Preliminary Report on Patentability dated Aug. 25, 2015.

WIPO Application No. PCT/US2014/017619, PCT International Search Report dated May 30, 2014.

WIPO Application No. PCT/US2014/017619, PCT Written Opinion of the International Searching Authority dated May 30, 2014.

WIPO Application No. PCT/US2014/051086, PCT International Preliminary Report on Patentability dated Feb. 15, 2016.

WIPO Application No. PCT/US2014/051086, PCT International Search Report dated Nov. 25, 2014.

WIPO Application No. PCT/US2014/051086, PCT Written Opinion of the International Searching Authority dated Nov. 25, 2014.

Knuth, "Dancing Links," arxiv.org, Cornell University Library, arXiv:cs/0011047 [cs.DS], 26 pages, 2000.

EPO Application No. 16200435.2 (Published as EP3193271), European Search Report and European Search Opinion dated Jun. 21, 2017.

U.S. Appl. No. 14/929,113, Non-Final Office Action dated Jun. 2, 2017.

EPO Application No. 14753896.1, Reply to the Opinion with the European Search Report dated Jun. 21, 2017.

U.S. Appl. No. 14/185,717, Non-Final Office Action dated Aug. 15, 2017.

U.S. Appl. No. 14/678,831, Notice of Allowance dated Jul. 12, 2017.

U.S. Appl. No. 14/929,113, Final Office Action dated Feb. 14, 2018.

U.S. Appl. No. 15/179,890, Non-Final Office Action dated Oct. 4, 2017.

U.S. Appl. No. 15/669,502, Non-Final Office Action dated Dec. 26, 2017.

U.S. Appl. No. 14/185,717, Final Office Action dated May 11, 2018.

U.S. Appl. No. 14/185,717, Non-Final Office Action dated Oct. 11, 2018.

U.S. Appl. No. 14/929,113, Non-Final Office Action dated Aug. 9, 2018.

(56) References Cited

OTHER PUBLICATIONS

U.S. Appl. No. 15/179,890, Notice of Allowance dated May 10, 2018.
U.S. Appl. No. 15/179,890, Notice of Allowance dated Sep. 12, 2018.
U.S. Appl. No. 15/359,579, Non-Final Office Action dated Apr. 16, 2018.
U.S. Appl. No. 15/669,502, Notice of Allowance dated Aug. 16, 2018.
U.S. Appl. No. 15/179,890, Non-Final Office Action dated Jan. 4, 2019.
U.S. Appl. No. 15/359,579, Final Office Action dated Nov. 26, 2018.
U.S. Appl. No. 15/669,502, Notice of Allowance dated Jan. 15, 2019.

* cited by examiner

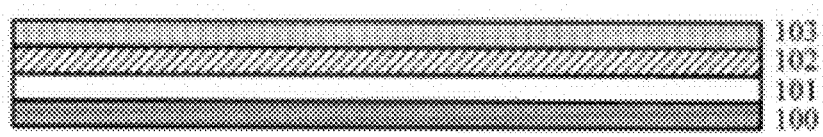
Figure 1A
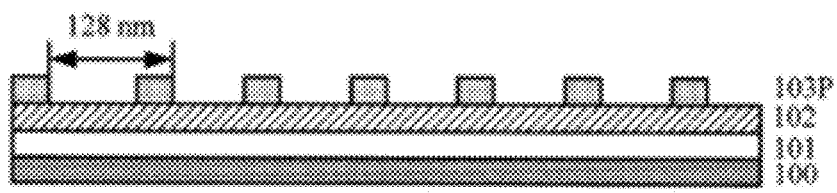
Figure 1B
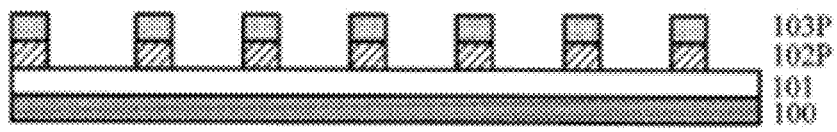
Figure 1C
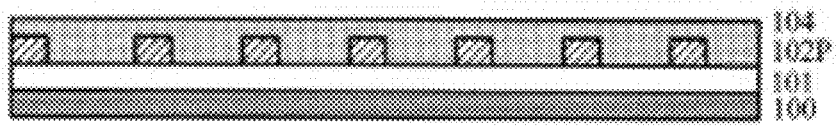
Figure 1D
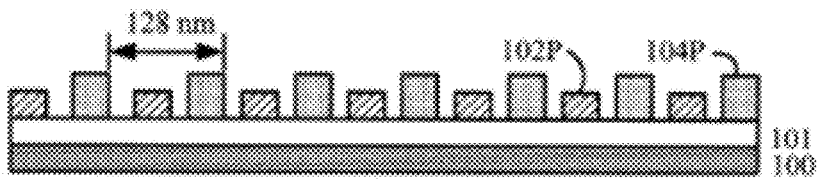
Figure 1E
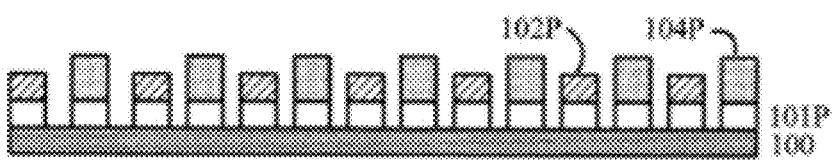
Figure 1F
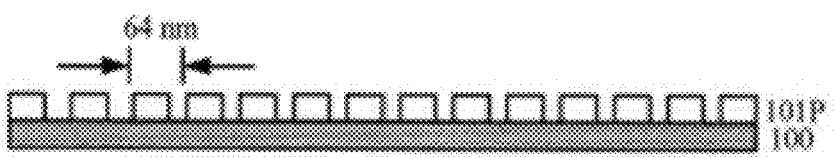
Figure 1G
FIG. 17

INCREMENTAL MULTI-PATTERNING VALIDATION

CROSS-REFERENCES TO RELATED APPLICATIONS

This application is related to U.S. Pat. No. 8,701,056 B1, filed on Sep. 26, 2012, entitled "AUTOMATED REPAIR METHOD AND SYSTEM FOR DOUBLE PATTERNING CONFLICTS" by Paul David Friedberg, et al., the content of which is incorporated herein by reference in its entirety.

BACKGROUND

The present disclosure relates to electronic design automation (EDA), and more particularly to validating integrated circuit (IC) design intents requiring multi-patterning technique or technology (MPT) by incrementally validating a portion of a design intent at a time.

Improvements in semiconductor process technology can increase the pattern density of shapes printed into a process layer on the surface of a wafer below the minimum manufacture-able line-and-space-width, hereinafter also referred to as "minimum pitch", that is achievable using just a single mask to pattern the process layer for a given generation of photolithography printing technology. As an example, double patterning technique or technology (DPT) is a type of MPT that has been used for manufacturing a design intent, hereinafter also referred to as "layout pattern," "layout," "design shapes," "shapes," "layout layer," or "layer," having more than a single pitch within the spacing of a single minimum pitch that is printable by using just a single photolithographic mask. DPT uses two different masks to produce higher pattern surface density in a process layer of the design intent than is achievable by using just one mask to print that layer. However, multi-patterning technology requires special design rules, EDA, and wafer processing procedures that are more complicated than standard photolithography printing technology. In particular, iteratively checking, hereinafter also referred to as iteratively "validating," a MPT design intent uses considerable computing resources and time.

Accordingly, there is a need to save computing resources and time for validation of design intents using MPT.

SUMMARY

According to one embodiment of the present invention, a computer-implemented method for validating a design characterized by a multi-patterning layer is presented. The method includes receiving the multi-patterning layer in a memory of the computer when the computer is invoked to validate the design. The method further includes correcting, using the computer, a first error in a first shape of the multi-patterning layer in accordance with a first rule thereby forming a corrected layer. The method further includes incrementally validating, using the computer, a first portion of the corrected layer in accordance with the first error and a first connected component of a first graph associated with the multi-patterning layer.

According to one embodiment, the first error prevents decomposition of the multi-patterning layer into a multitude of colors. According to one embodiment, the first portion includes each one of a first multitude of shapes in the corrected layer associated with the first connected component that includes a first vertex associated with the first shape.

According to one embodiment, the method further includes cutting, using the computer, a second shape of the multi-patterning layer associated with an articulation point of the first graph thereby forming a second connected component different from the first connected component. According to one embodiment, the second shape is connected to a power or ground line in the design.

According to one embodiment, the method further includes forming, using the computer, a second graph including the first connected component and a second connected component different from the first connected component, and selecting, using the computer, the first portion of the corrected layer. The method further includes validating, using the computer, the selected first portion of the corrected layer without validating a second portion of the corrected layer associated with the second connected component.

According to one embodiment, selecting includes determining a first area associated with a change between the multi-patterning layer and the corrected layer that corrects the first error, and increasing a size of the first area by a third rule thereby forming a second area. Selecting further includes selecting the first connected component associated with at least one of a first multitude of shapes of the multi-patterning data base that interact with the second area. Selecting further includes determining a third area in accordance with the selected first connected component, the first area, and the second area. Selecting further includes selecting each one of the second multitude of shapes of the corrected layer that interact with the third area thereby forming the first portion of the corrected layer.

According to one embodiment, the first graph is the same as the second graph. According to one embodiment, the first graph is different from the second graph. According to one embodiment, forming the second graph includes identifying, using the computer, an articulation point of the first graph. Forming the second graph includes cutting, using the computer, a shape of the multi-patterning layer associated with the articulation point thereby forming a second shape associated with the first connected component and a third shape associated with the second connected component.

According to one embodiment of the present invention, a computer system is operative to receive a multi-patterning layer of a design in a memory of the computer when the computer is invoked to validate the design. The computer system is further operative to correct a first error in a first shape of the multi-patterning layer in accordance with a first rule thereby forming a corrected layer. The computer system is further operative to incrementally validate a first portion of the corrected layer in accordance with the first error and a first connected component of a first graph associated with the multi-patterning layer.

According to one embodiment, the computer system is further operative to cut a second shape of the multi-patterning layer associated with an articulation point of the first graph thereby forming a second connected component different from the first connected component. According to one embodiment, the computer system is further operative to form a second graph including the first connected component and a second connected component different from the first connected component, and select the first portion of the corrected layer. The computer system is further operative to validate the selected first portion of the corrected layer without validating a second portion of the corrected layer associated with the second connected component.

According to one embodiment, the computer system is further operative to determine a first area associated with a change between the multi-patterning layer and the corrected layer that corrects the first error, and increase a size of the first area by a third rule thereby forming a second area. The computer system is further operative to select the first connected component associated with at least one of a first multitude of shapes of the multi-patterning data base that interact with the second area. The computer system is further operative to determine a third area in accordance with the selected first connected component, the first area, and the second area. The computer system is further operative to select each one of the second multitude of shapes of the corrected layer that interact with the third area thereby forming the first portion of the corrected layer.

According to one embodiment, the computer system is further operative to identify an articulation point of the first graph, and cut a shape of the multi-patterning layer associated with the articulation point thereby forming a second shape associated with the first connected component and a third shape associated with the second connected component.

According to one embodiment of the present invention, a non-transitory computer-readable storage medium comprising instructions, which when executed by a computer, cause the computer to receive a multi-patterning layer of a design in a memory of the computer when the computer is invoked to validate the design. The instructions further cause the computer to correct a first error in a first shape of the multi-patterning layer in accordance with a first rule thereby forming a corrected layer. The instructions further cause the computer to incrementally validate a first portion of the corrected layer in accordance with the first error and a first connected component of a first graph associated with the multi-patterning layer.

According to one embodiment, the instructions further cause the computer to cut a second shape of the multi-patterning layer associated with an articulation point of the first graph thereby forming a second connected component different from the first connected component.

According to one embodiment, the instructions further cause the computer to form a second graph including the first connected component and a second connected component different from the first connected component, and select the first portion of the corrected layer. The instructions further cause the computer to validate the selected first portion of the corrected layer without validating a second portion of the corrected layer associated with the second connected component.

According to one embodiment, the instructions further cause the computer to determine a first area associated with a change between the multi-patterning layer and the corrected layer that corrects the first error, and increase a size of the first area by a third rule thereby forming a second area. The instructions further cause the computer to select the first connected component associated with at least one of a first multitude of shapes of the multi-patterning data base that interact with the second area. The instructions further cause the computer to determine a third area in accordance with the selected first connected component, the first area, and the second area. The instructions further cause the computer to select each one of the second multitude of shapes of the corrected layer that interact with the third area thereby forming the first portion of the corrected layer.

According to one embodiment, the instructions further cause the computer to identify an articulation point of the first graph, and cut a shape of the multi-patterning layer associated with the articulation point thereby forming a second shape associated with the first connected component and a third shape associated with the second connected component.

A better understanding of the nature and advantages of the embodiments of the present invention may be gained with reference to the following detailed description and the accompanying drawings.

BRIEF DESCRIPTION OF THE DRAWINGS

FIG. 17 depicts a series of exemplary process cross sections of one double patterning process that may implement the features, aspects, and steps of the methods discussed herein.

DETAILED DESCRIPTION

Figure 1:
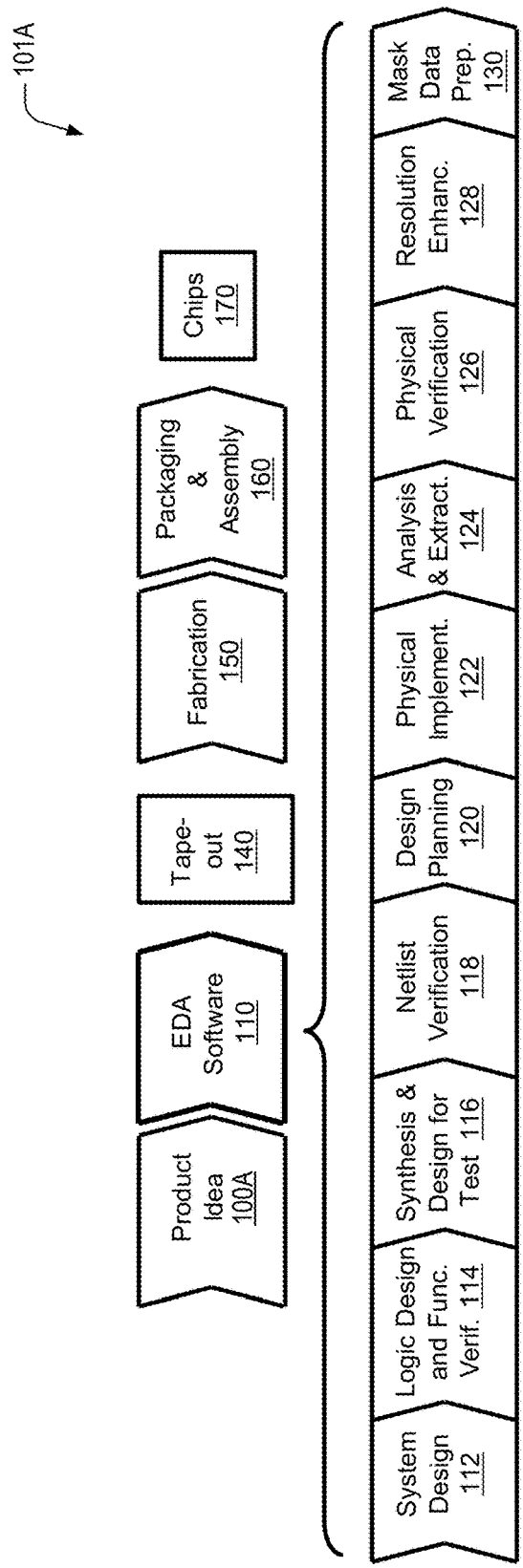
FIG. 1 depicts simplified exemplary steps in the design and fabrication of an integrated circuit, which may use embodiments of the present invention.

FIG. 1 depicts various steps 101A in the design and fabrication of an integrated circuit. The process starts with a product idea 100A, which may be realized using Electronic Design Automation (EDA) software 110. Chips 170 can be produced from the finalized design by performing fabrication 150 and packaging and assembly 160 steps. An exemplary design flow that uses EDA software 110 is described below for illustration purposes only. For example, an actual integrated circuit design may require a designer to perform the design flow steps in a different sequence than the sequence described below.

In the system design 112, a designer describes the functionality to be implemented. The designer can also perform what-if planning to refine the functionality and to check costs. Further, hardware-software architecture partitioning can occur at this step. In the design and functional verification 114, a Hardware Description Language (HDL) design may be created and checked for functional accuracy.

In the synthesis and design 116, the HDL code can be translated to a netlist, which can be optimized for the target technology. Further, tests may be designed and implemented to check the finished chips. In the netlist verification 118, the netlist may be checked for compliance with timing constraints and for correspondence with the HDL code. In the design planning 120, an overall floor plan for the chip can be constructed and analyzed for timing and top-level routing. Next, in the physical implementation 122, placement and routing may be performed.

In the analysis and extraction 124, the circuit functionality may be verified at a transistor level. In the physical verification 126, the design may be checked to correct any functional, manufacturing, electrical, or lithographic issues. In the resolution enhancement 128, geometric manipulations may be performed on the layout to improve manufacturability of the design. Finally, in the mask data preparation 130, the design can be taped-out 140 for production of masks to produce finished chips. The embodiments of the present invention may be used, for example at the steps of either physical verification 126, resolution enhancement 128, and/or mask data preparation 130. A MPT or DPT lithography process may be used to print complex design intents or shapes on a single layer of an IC process using two or more separate masks with higher pattern density than the pattern density provided by using a single mask photolithographic printing process, as will be described in greater detail below.

Figure 2:
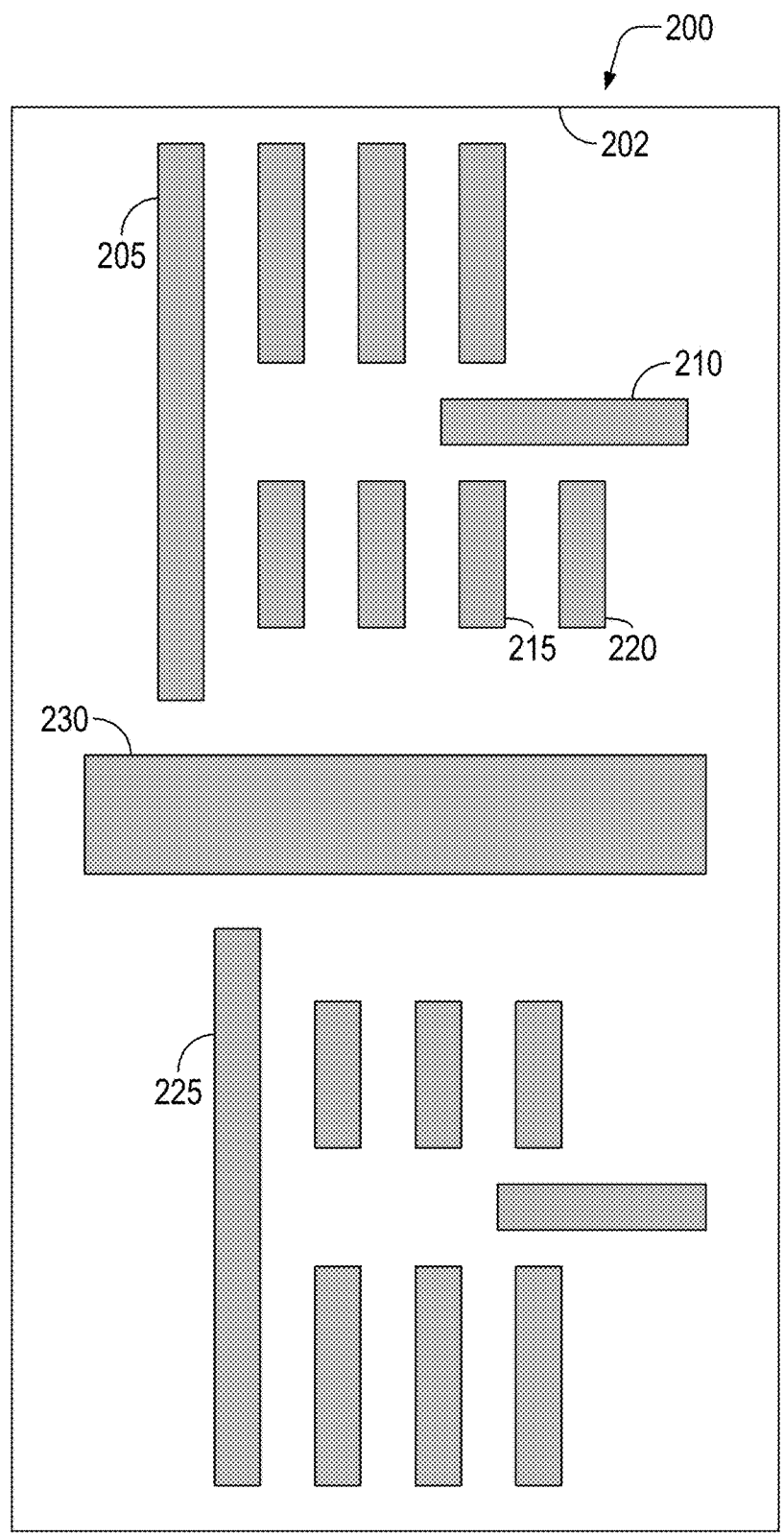
FIG. 2 depicts an example of a multi-patterning layer of a design intent, which may use embodiments of the present invention.

FIG. 2 depicts an example of a multi-patterning layer 200 of a design intent that may use embodiments of the present invention. In one embodiment, multi-patterning layer 200 may correspond to a single metal layer of an IC chip that requires MPT or DPT. Multi-patterning layer 200 may include a chip extent 202 within which a multitude of shapes 205-230 are disposed. In one embodiment, shape 230 may include a connection to a power or ground line in the design and may be characterized by extending adjacently to a multitude of other shapes in multi-patterning layer 200.

Although, the invention will been described below with reference to DPT by way of an example, it is understood that the invention is not limited by the use of DPT but may also be applicable to any type of MPT including multi-patterning that uses more than two masks. In one embodiment, the design intent may in any combination include just one multi-patterning layer, a multitude of multi-patterning layers, or a multitude of design layers that do not use MPT, each associated with a different one of a multitude of masks, each in-turn used to manufacture a different one of a multitude of associated process layers.

In one embodiment, multi-patterning layer 200 requires the use of MPT because some of the multitude of shapes 205-230 may be allowably spaced apart by a spacing greater than a minimum spacing rule or constraint of the double patterning layer, hereinafter also referred to as "minSpacing," but which is smaller than the spacing constraint allowable without the use of MPT lithography, hereinafter also referred to as "max_MPT_space." In other words, shapes that are all spaced apart by a value equal to or greater than at least max_MPT_space may be lithographically patterned using just one non-MPT mask. The spacing between a pair of shapes that require MPT may be a set of values associated with the configuration of the pair of shapes. "Max_MPT_space" may refer to the largest, e.g. "maximum," value of this set of spacing values below which MPT is required. In one embodiment for DPT, multitude of shapes 205-230 may need to be decomposed into at least two colors, e.g. color A, color B corresponding respectively to mask A, mask B used to lithographically pattern the same DPT process layer as will be explained in greater detail below.

Figure 3:
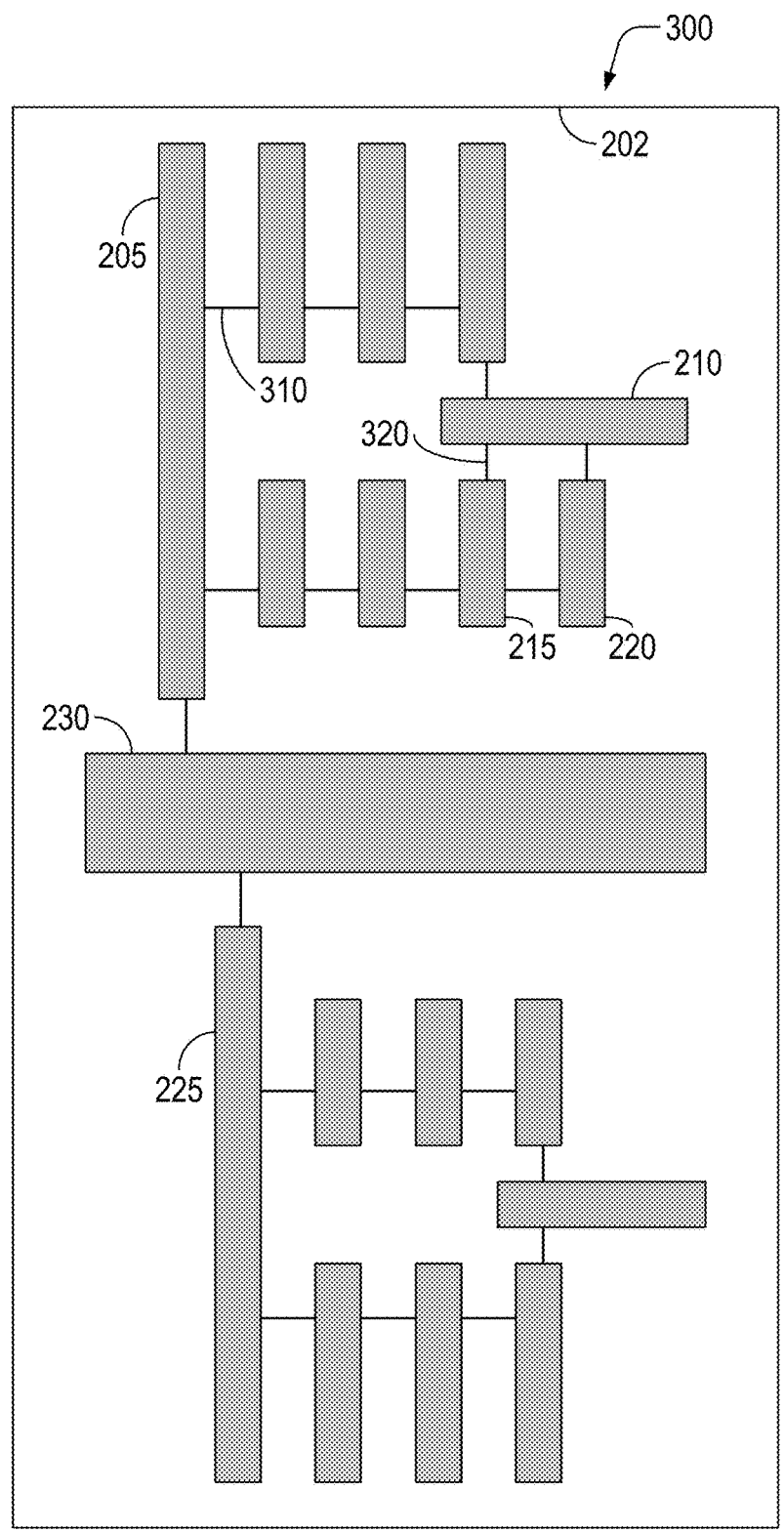
FIG. 3 depicts a simplified example multi-patterning layer including the multi-patterning layer depicted in FIG. 2 and further including a multitude of links, which may use embodiments of the present invention.

FIG. 3 depicts a simplified example multi-patterning layer 300 including the multi-patterning layer 200 depicted in FIG. 2 and further including a multitude of links 310, 320, which may use embodiments of the present invention. Multi-patterning layer 300 includes the same features and functions as multi-patterning layer 200 depicted in FIG. 2 except as described below. Multitude of links 310, 320, depicted as short line segments, indicate where the spacing value between any of the multitude of shapes 205-230 is within allowable minSpacing design rule or constraint value but where the spacing value is smaller than the max_MPT_space rule or constraint and therefore requiring MPT.

For example, link 320 requires that shapes 210, 215 immediately adjacent to link 320 may not be placed on the same mask but are allowed to be placed on a multitude of different MPT masks, i.e. a multitude of different colors, used to pattern the single process layer using MPT. For example, shape 210 may be assigned to a mask A and shape 215 may be assigned to a different mask B, where masks A and B are two masks both used in DPT to pattern the single processing layer. In one embodiment, the single processing layer may correspond to a single metal layer of an IC chip that requires DPT due to the small spacing required between adjacent metal shapes.

Figure 4:
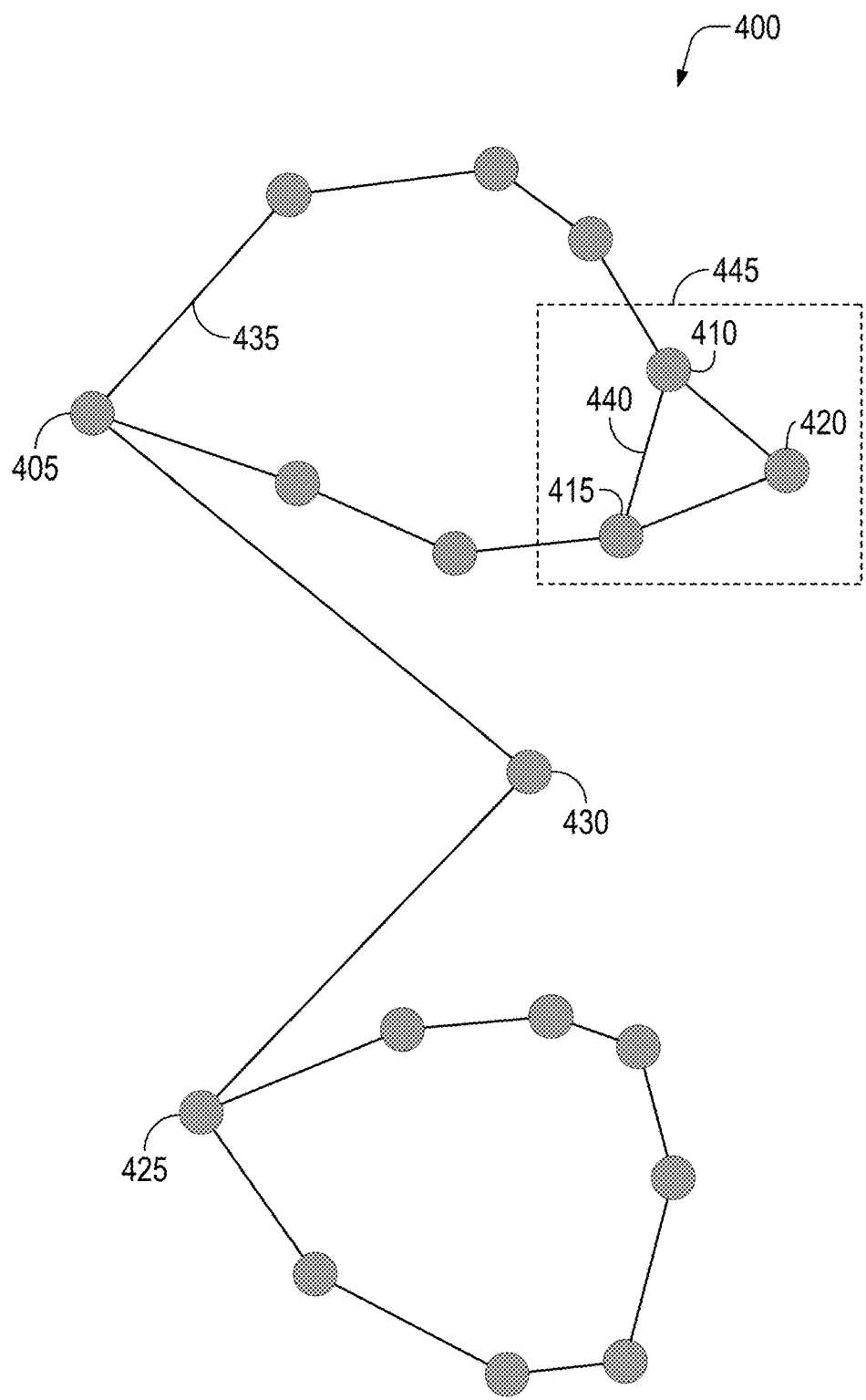
FIG. 4 depicts a simplified graph representing multi-patterning layer 300 depicted in FIG. 3, which may use embodiments of the present invention.

FIG. 4 depicts a simplified graph 400 representing multi-patterning layer 300 depicted in FIG. 3, which may use embodiments of the present invention. Referring simultaneously to FIGS. 3-4, simplified graph 400 may include and/or be characterized by a multitude of vertices 405-430, each respectively associated with a different one of the multitude of shapes 205-230. Simplified graph 400 may further include and/or be characterized by a multitude of edges 435, 440 each joining a different associated pair of the multitude of vertices that are constrained by the above MPT rules or constraints. Accordingly, multitude of edges 435, 440, is each respectively associated with a different one of the multitude of links 310, 320. For example, a pair of vertices 410, 415, which are respectively associated with a pair of shapes 210, 215, are connected by edge 440, which in turn is associated with link 320.

According to graph theory, graph 400 forms a single group of vertices called a connected component where each vertex is either directly or indirectly connected via edges to other vertices of the connected component, not to be confused with electronic components such as capacitors or transistors. It is understood that a graph may include a multitude of connected components or just a single connected component.

To be compatible with DPT, simplified graph 400 representative of multi-patterning layer 300 should be two-colorable, e.g. decomposable into two colors or masks without any conflicts or design rule violations. Links and/or edges may be characterized as being allowable or conflicting. A conflict link and/or edge, hereinafter also referred to as a "conflict," occurs when any edge of the graph is terminated by two vertices of the same color and may be determined in accordance with the concept of cycles. A cycle is any set of vertices connected by a closed loop of edges.

Cycles may be characterized as being even or odd. An even cycle includes an even number of vertices. An odd cycle includes an odd number of vertices and will not be decomposable into two colors because an odd cycle will contain an edge that is a conflict edge. Accordingly, any set of vertices that includes no cycles or only even cycles is decomposable into two colors, while any set of vertices that includes any odd cycles is not decomposable into two colors.

It is understood that conflict links or errors are not to be confused with other types of design rule violations or errors. For example, the spacing corresponding to the conflict link may be allowable per the DPT design rules only if it were not for the issue that the conflict link is between two shapes assigned to the same color.

Graph 400 includes an odd cycle 445, depicted within the dashed rectangle, and should therefore not be decomposable into two colors or two-colorable no matter what combination of two colors are assigned to vertices 410-420 in odd cycle 445. Eliminating edge 440 eliminates odd cycle 445. Therefore, edge 440 and associated link 320 may be called a conflict edge or link. For double-patterning, determining whether a graph is two-colorable may be solved for each connected component in the graph by a compact, linear time algorithm to determine conflicts. However, eliminating edge 440 alone may not eliminate other conflict edges/links as described below.

Figure 5:
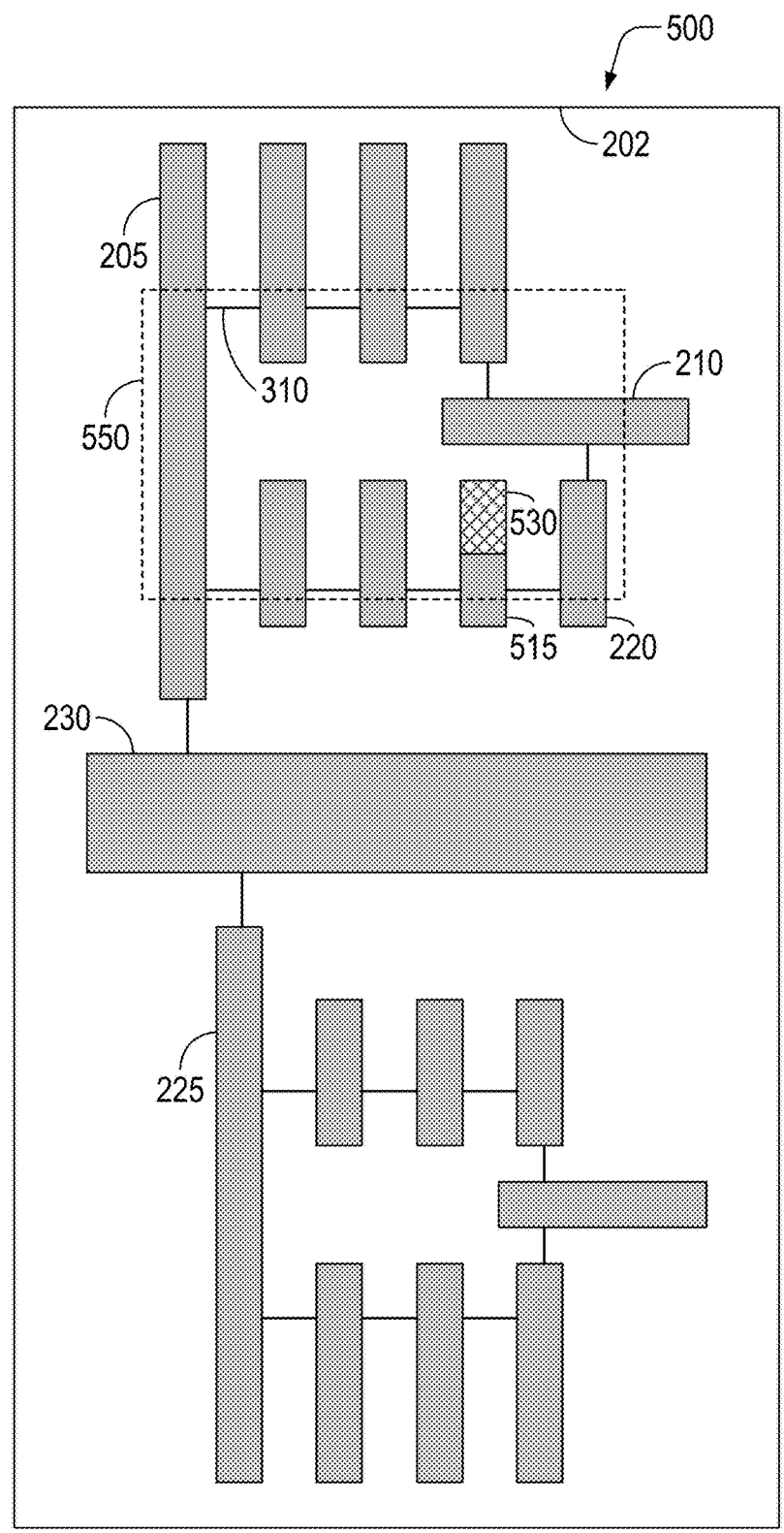
FIG. 5 depicts a corrected layer, which may use embodiments of the present invention.

FIG. 5 depicts a corrected layer 500, which may use embodiments of the present invention. Corrected layer 500 includes the same features and functions as multi-patterning layer 300 depicted in FIG. 3 except as described below. Referring simultaneously to FIGS. 3-5, shape 215 may be pulled away from shape 210 so as to ensure a spacing greater than or equal to max_MPT_space, thereby forming shape 515 to eliminate conflict link 440. However, other conflicts or errors may still remain in corrected layer 500 such as indicated by the odd cycle 550 depicted by the dotted line rectangle, which includes link 310.

Validating multi-patterning layer 300 may include iteratively identifying one conflict link/edge, correcting the conflict or error, identifying a remaining conflict, and repeating until all conflicts are removed. The iterative identification of conflict links across a large connected component may consume a large amount of computing resource and time. Accordingly, revalidation techniques have been proposed that revalidate only in a window surrounding the immediately previous conflict by a fixed value, e.g. near the space represented by link 320. However, such windowed revalidations may not comprehend conflicts that extend in loops that are larger or outside the window described above, such as for example the odd cycle including link 310. Accordingly, there is a need to save computing resources and time for revalidation of design intents using MPT without relying on a window using a fixed distance around the immediately previous coloring-conflict error.

Figure 6:
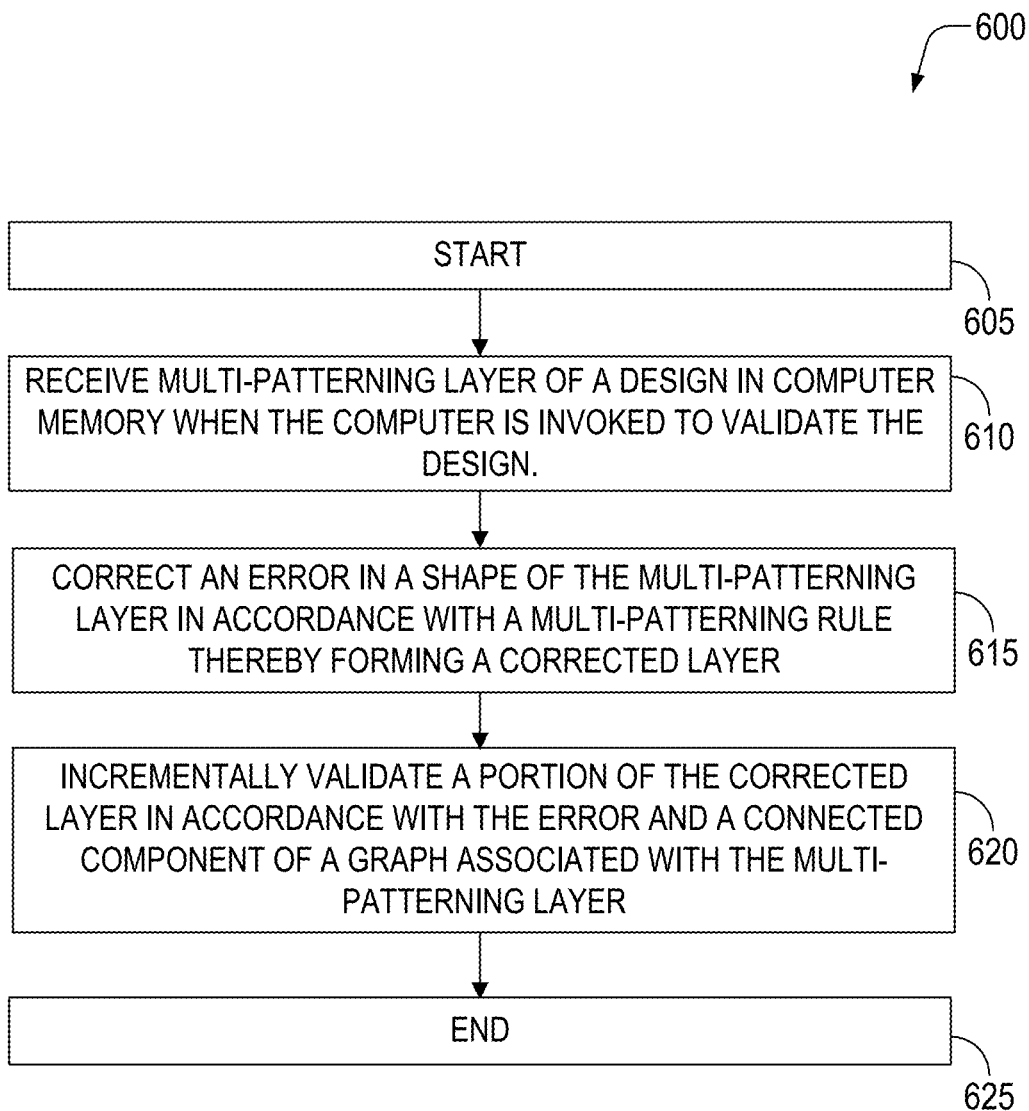
FIG. 6 depicts a simplified exemplary flow chart of a technique for incrementally validating a design characterized by the multi-patterning layer depicted in FIG. 2, in accordance with one embodiment of the present invention.

FIG. 6 depicts a simplified flow chart 600 of a technique for incrementally validating a design characterized by multi-patterning layer 200 depicted in FIG. 2, in accordance with one embodiment of the present invention. Referring simultaneously to FIGS. 2, and 5-6, after starting 605, flow chart 600 includes receiving 610 multi-patterning layer 200 of an integrated circuit design in computer memory when the computer is invoked to validate the design. Flow chart 600 further includes correcting 615 an error in a shape of the multi-patterning layer in accordance with a multi-patterning rule thereby forming a corrected layer 500 such as depicted in FIG. 5. Flow chart 600 further includes incrementally validating 620 a portion (element 1215 referenced below in FIGS. 12-13, 16) of corrected layer 500 in accordance with the immediately previous error and a connected component of a graph associated with the multi-patterning layer and ending the flow chart at 625, as will be described in greater detail below.

Figure 7:
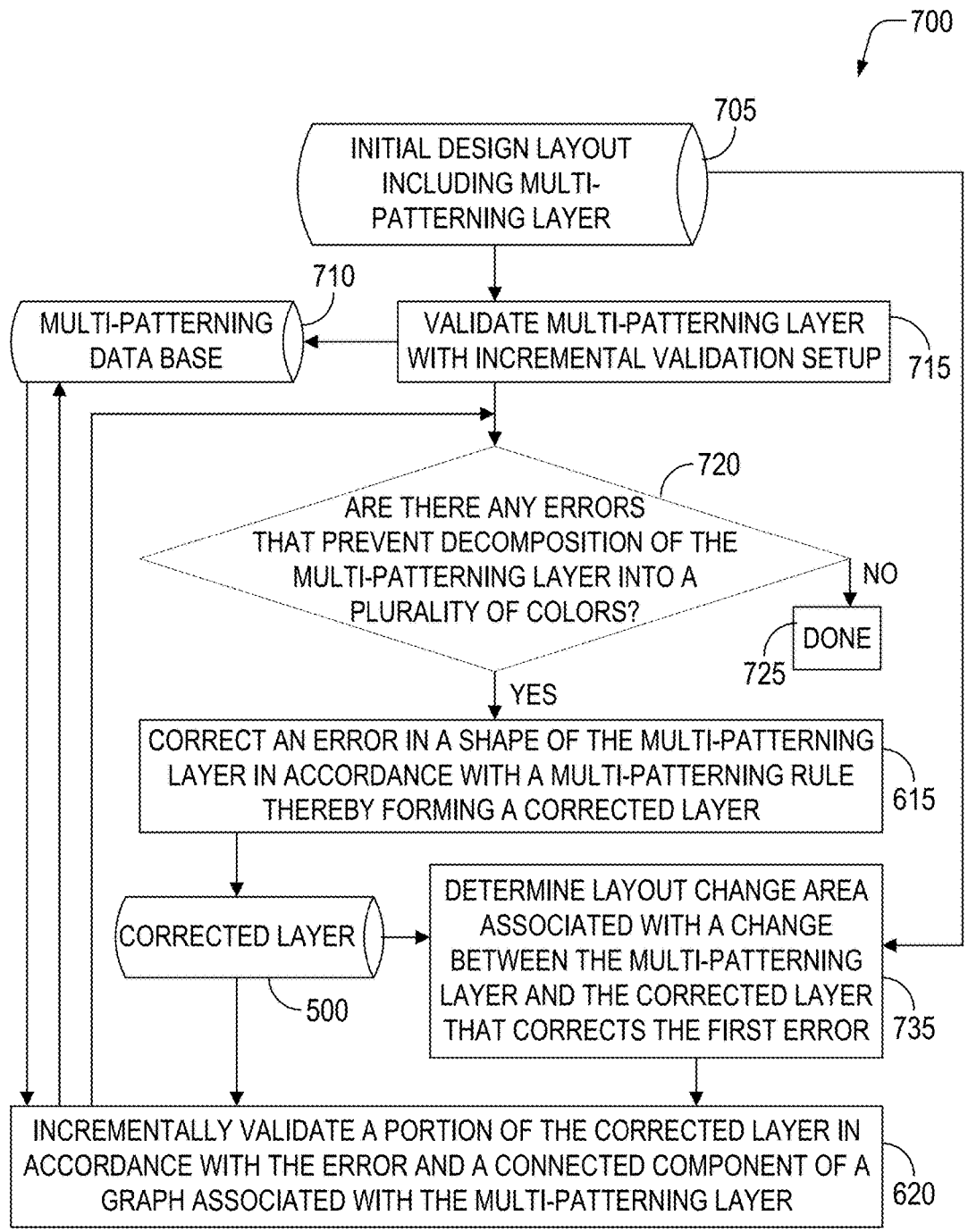
FIG. 7 depicts a simplified exemplary flow chart depicting more details for the flow chart depicted in FIG. 6 for iteratively and incrementally validating the design, in accordance with one embodiment of the present invention

FIG. 7 depicts a simplified exemplary flow chart 700 depicting more details for the flow chart 600 depicted in FIG. 6 for iteratively and incrementally validating the design, in accordance with one embodiment of the present invention. Referring simultaneously to FIGS. 2, and 7, flow chart 700 includes receiving an initial design layout data base 705 that includes multi-patterning layer 200. Next, multi-patterning layer 200 may be initially validated 715 with incremental validation setup to generate a new multi-patterning data base 710 as will be described in greater detail below.

Figure 8:
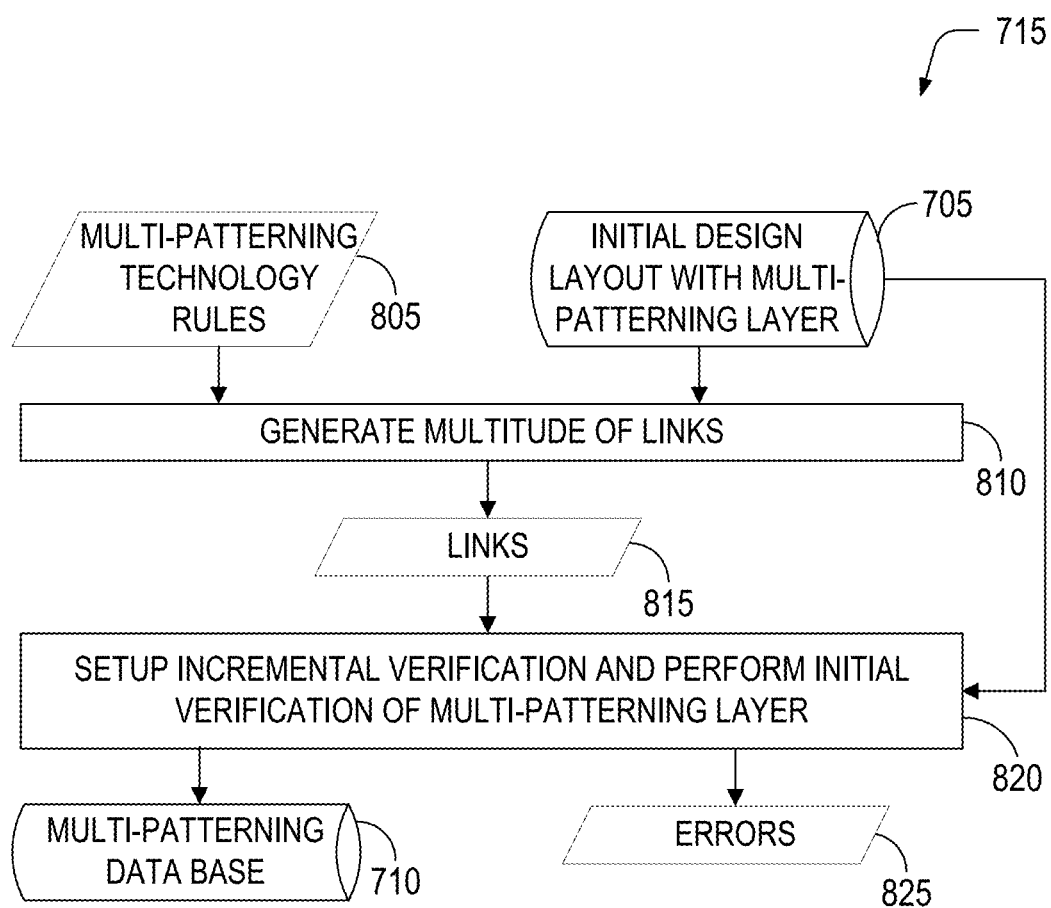
FIG. 8 depicts a simplified exemplary flow chart for the step of validating the multi-patterning layer with incremental validation setup depicted in FIG. 7, in accordance with one embodiment of the present invention.

FIG. 8 depicts a simplified exemplary flow chart 715 for the step of validating multi-patterning layer 200 with incremental validation setup depicted in FIG. 7, in accordance with one embodiment of the present invention. Referring simultaneously to FIGS. 2, 3, and 8, flow chart 715 includes receiving initial design layout data base 705 that includes multi-patterning layer 200 along with receiving a multitude of multi-patterning technology rules 805 that are used to generate 810 multitude of links 310, 320 corresponding to links 815. Next, multitude of links 310, 320, 815 and initial design layout data base 705, which includes multi-patterning layer 200, are used to perform step 820. Step 820 includes setting up future incremental verification and presently performing initial verification of multi-patterning layer 300, which are both discussed in greater detail below. Step 820 outputs new multi-patterning data base 710 discussed below.

Figure 9:
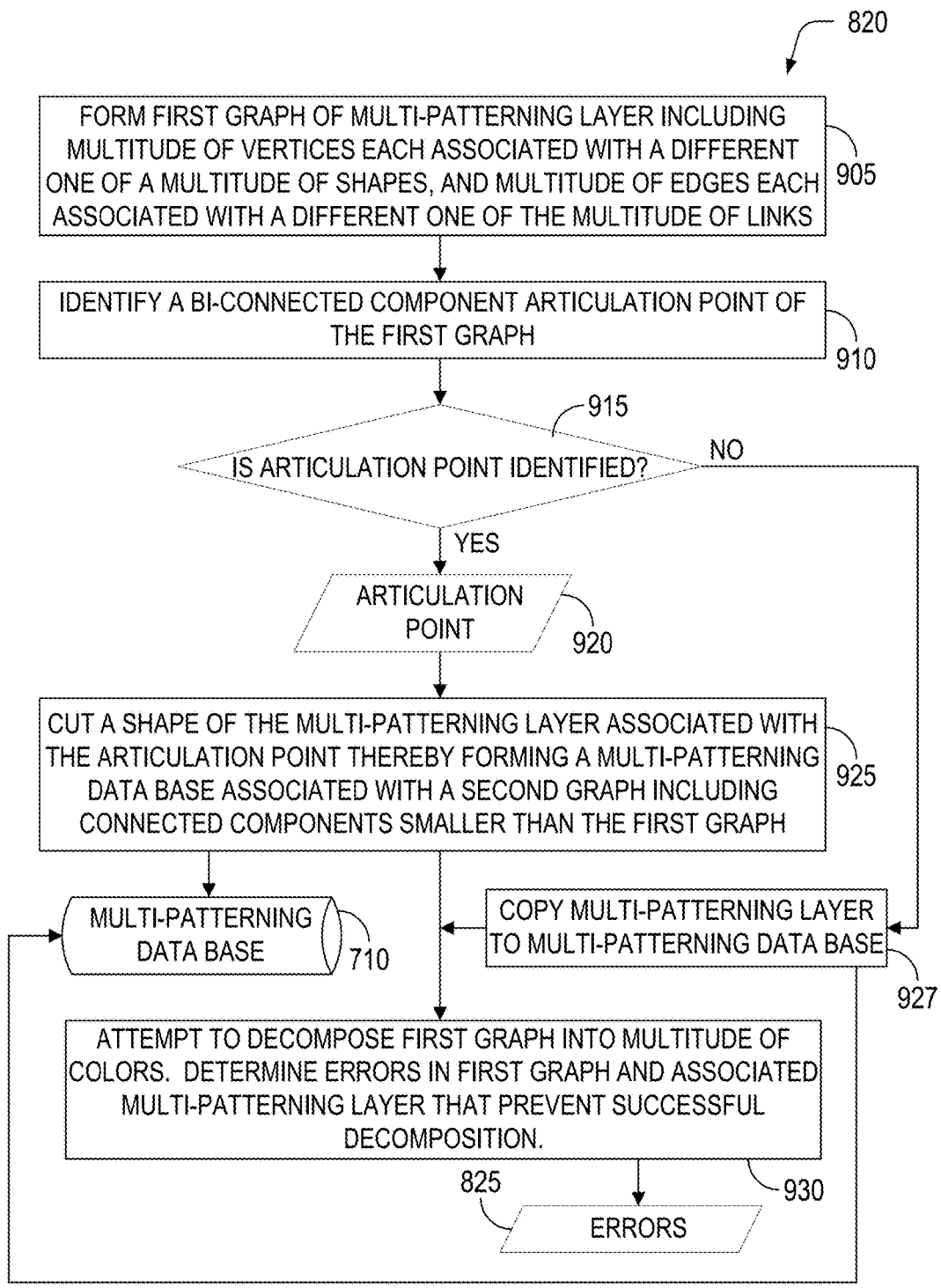
FIG. 9 depicts a simplified exemplary flow chart for the step of setting up future incremental verification and presently performing initial verification depicted in FIG. 8, in accordance with one embodiment of the present invention.

FIG. 9 depicts a simplified exemplary flow chart 820 for the step of setting up future incremental verification and presently performing initial verification depicted in FIG. 8, in accordance with one embodiment of the present invention. Referring simultaneously to FIGS. 3, 4, and 8, flow chart 820 includes forming 905 graph 400 of multi-patterning layer 300, which includes multitude of vertices 405-430 each associated with a different one of multitude of shapes 205-230. Graph 400 further includes multitude of edges 435, 440 each associated with a different one of multitude of links 310, 320.

Next, flow chart 820 identifies 910 a bi-connected component (BCC) articulation point of graph 400, which corresponds to vertex 430. Vertex 430 is a BCC articulation point because if vertex 430 is cut in the middle and turned into a pair of vertices with no connecting link between the pair, the resulting graph (see description referring to FIG. 11 below) may be divided into two separate connected components each of which is a BCC. For any pair of vertices in a BCC, there are at least two paths of edges connecting between the pair, hence the pair is twice-connected or bi-connected. In other words a BCC is a connected component that remains a connected component even after removal of any one vertex. A connected component may be partitioned into possibly more than two BCC. Further, a BCC may be validated independently for MPT errors, meaning an MPT error is fully contained inside a BCC and will not cross a pair of different BCCs.

Figure 10:
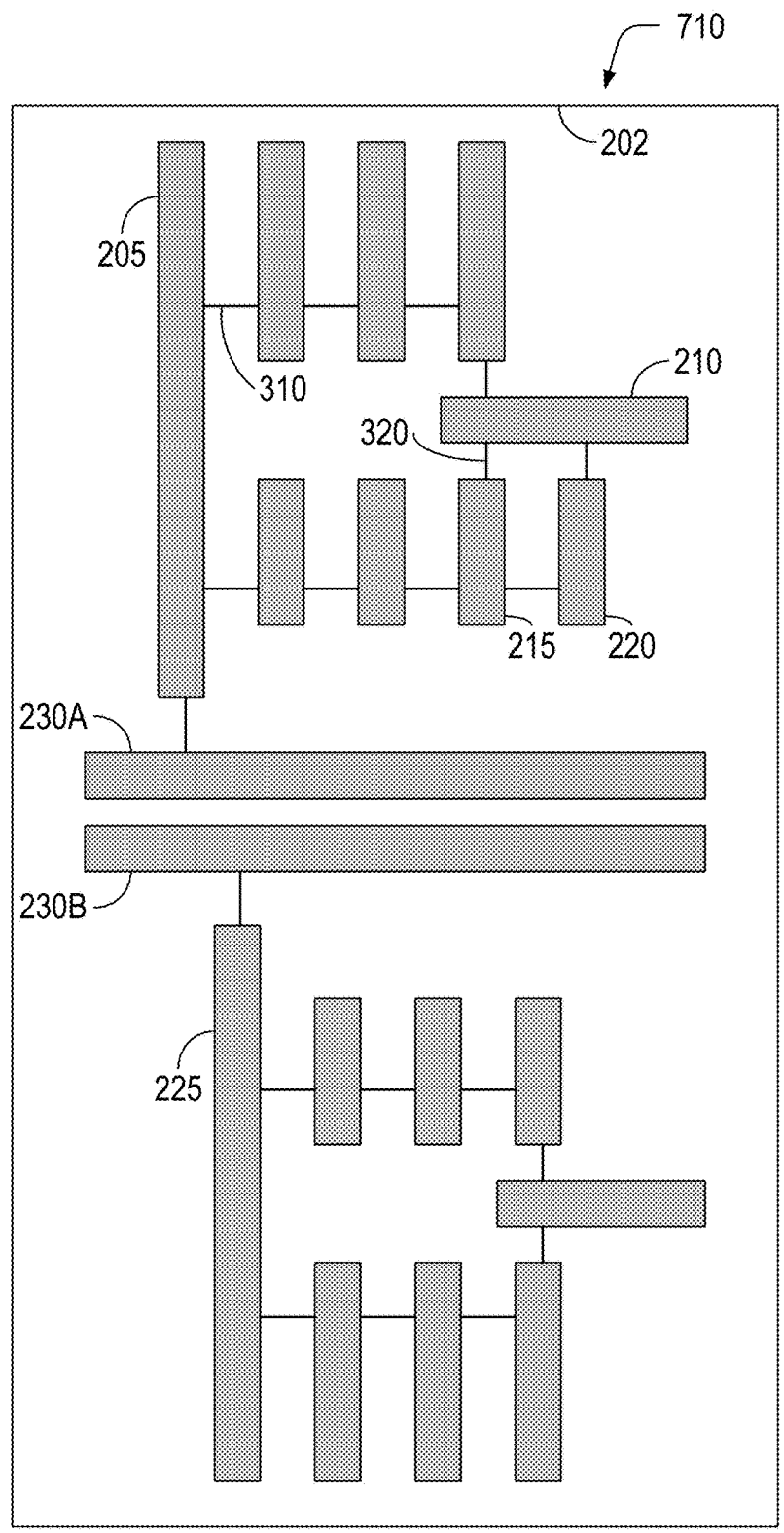
FIG. 10 depicts a simplified exemplary multi-patterning data base resulting from cutting a shape of the multi-patterning layer depicted in FIG. 3 that is associated with an articulation point of the graph depicted in FIG. 4, in accordance with one embodiment of the present invention.

FIG. 10 depicts a simplified exemplary multi-patterning data base 710 resulting from cutting shape 230 of the multi-patterning layer 300 depicted in FIG. 3 and associated with the identified articulation point, i.e. vertex 430, of graph 400 depicted in FIG. 4, in accordance with one embodiment of the present invention. Multi-patterning data base 710 includes the same features and functions as multi-patterning layer 300 depicted in FIG. 3 except as described below. Shape 230 which is cut longitudinally is replaced by two shapes 230A and 230B, while simultaneously preserving all the multitude of links 310, 320 that were previously present in multi-patterning layer 300.

Figure 11:
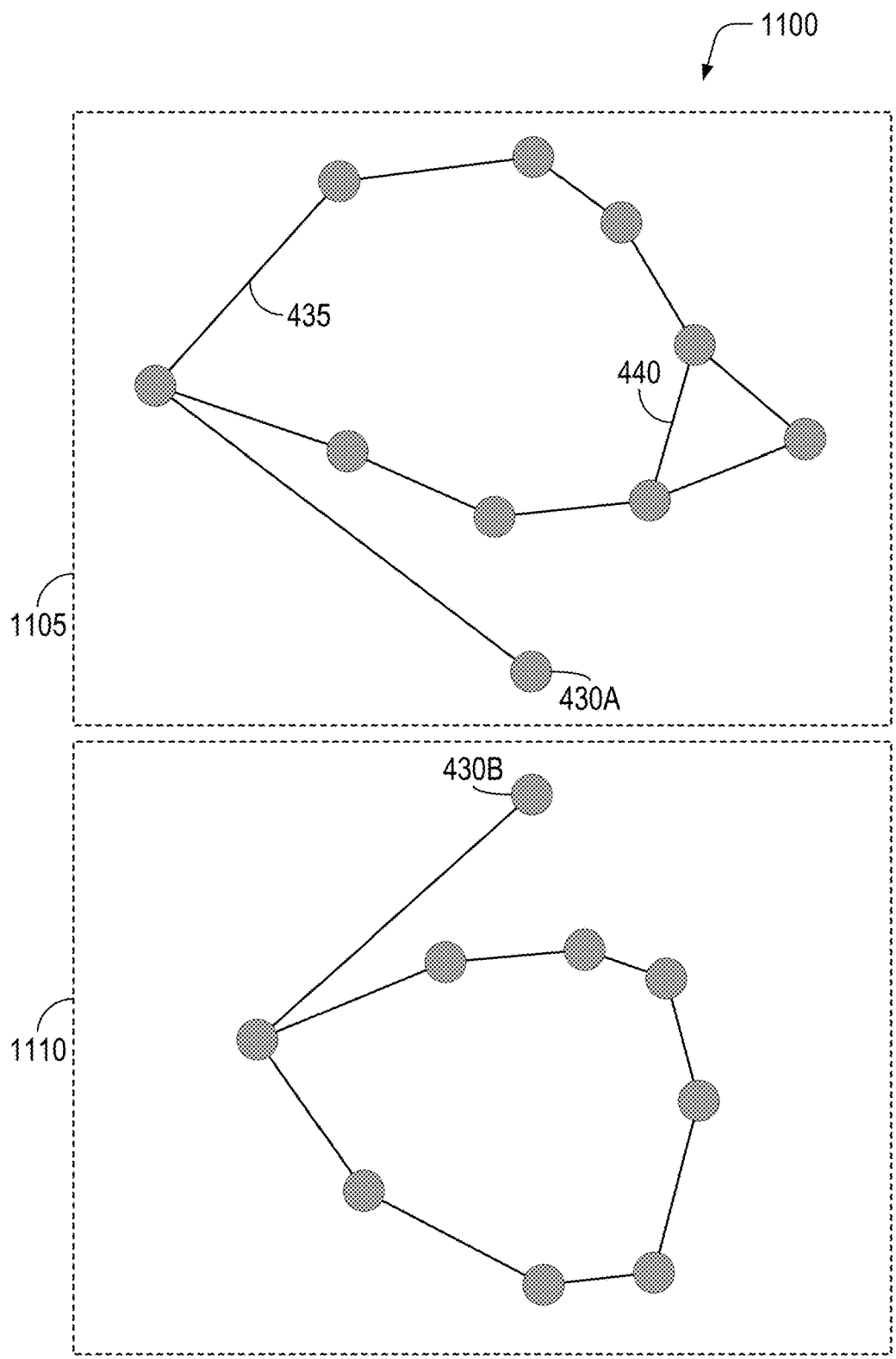
FIG. 11 depicts a simplified exemplary new graph associated with the multi-patterning data base depicted in FIG. 10, in accordance with one embodiment of the present invention.

FIG. 11 depicts a simplified exemplary new graph 1100 associated with or included in the multi-patterning data base 710 depicted in FIG. 10, in accordance with one embodiment of the present invention. Graph 1100 includes the same features and functions as graph 400 depicted in FIG. 4 except as described below. Referring simultaneously to FIGS. 4 and 11, graph 1100 includes vertices 430A, 430B that replace vertex 430. Accordingly, the single connected component of graph 400 is divided into two different and smaller connected components 1105, 1110 such that connected component 1105 includes vertex 430A and connected component 1110 includes vertex 430B, while preserving all the edges that were previously connected to vertex 430.

Referring simultaneously to FIGS. 3-4, and 9-11, if 915 an articulation point is identified, flow chart 820 next cuts 925 shape 230 of the multi-patterning layer 300 because shape 230 is associated with the articulation point, i.e. vertex 430. Cutting shape 230 thereby forms multi-patterning data base 710, which is associated with new graph 1100, which then includes a multitude of connected components 1105, 1110 each smaller, i.e. having fewer vertices, than the single connected component graph 400. Accordingly, longitudinally cutting shape 230 of multi-patterning layer 300 forms shape 230A associated with vertex 430A of connected component 1105. Longitudinally cutting shape 230 further forms shape 230B associated with vertex 430B of connected component 1110. Multi-patterning data base 710 is distinct from multi-patterning layer 300 and corrected layer 500 because the cutting of shape 230 into shapes 230A, 230B is not intended to be a correction in the design intent, and is instead done to facilitate the embodiments as described in greater detail below.

Referring again simultaneously to FIGS. 3-4, and 9, in some embodiments it is understood that if the graph associated with the multi-patterning layer may not include an articulation point, e.g. shape 230 is not included in multi-patterning layer 300 (not shown). Accordingly, if the graph associated with multi-patterning layer 300 did not include an articulation point, then multi-patterning layer 300 may be copied 927 to multi-patterning data base 710. However, the chance for the existence of articulation points is high since shapes associated with power and ground connections that inherently provide articulation points are common in multi-patterning layers. Irrespective of identifying an articulation point, flow chart 820 next attempts to decompose 930 graph 400 into a multitude of colors, determine a coloring conflict or error edge 440 in graph 400 and associated link 320 in multi-patterning layer 300 that prevent successful decomposition into two colors. The errors 825, including conflict edge 440 and associated conflict link 320 are output from flow chart 820 and flow chart 715 to return to flow chart 700.

Referring simultaneously to FIGS. 3-5, and 7-8, in flow chart 700, after step 715 creates multi-patterning data base 710, if 720 there are no more color decomposition errors 825, then the flow is done 725. If 720 there are any errors 825 that prevent decomposition of multi-patterning layer 300 into a multitude of colors, then flow chart 700 includes correcting 615 an error 825, e.g. link 320, in a shape 215 of multi-patterning layer 300 in accordance with a multi-patterning rule, thereby forming corrected layer 500.

Next, flow chart 700 includes determining 735 a layout change area 530 associated with a change between multi-patterning layer 300 in the initial design layout and corrected layer 500 that corrects error 825. It is noted that layout change area 530 is depicted with corrected layer 500 in FIG. 5 merely to help explain the embodiments, however, layout change area 530 is not included in corrected layer 500 and is instead a separate data element whose position in relation to the chip extent is as depicted in FIG. 5. Referring simultaneously to FIGS. 3, 5, 7, and 11, flow chart 700 includes incrementally validating 620 a portion (element 1215 referenced below in FIGS. 12-13, 16) of corrected layer 500 in accordance with error 825 and connected component 1105 of graph 1100 associated with multi-patterning layer 300 as will be described in greater detail below.

Figure 12:
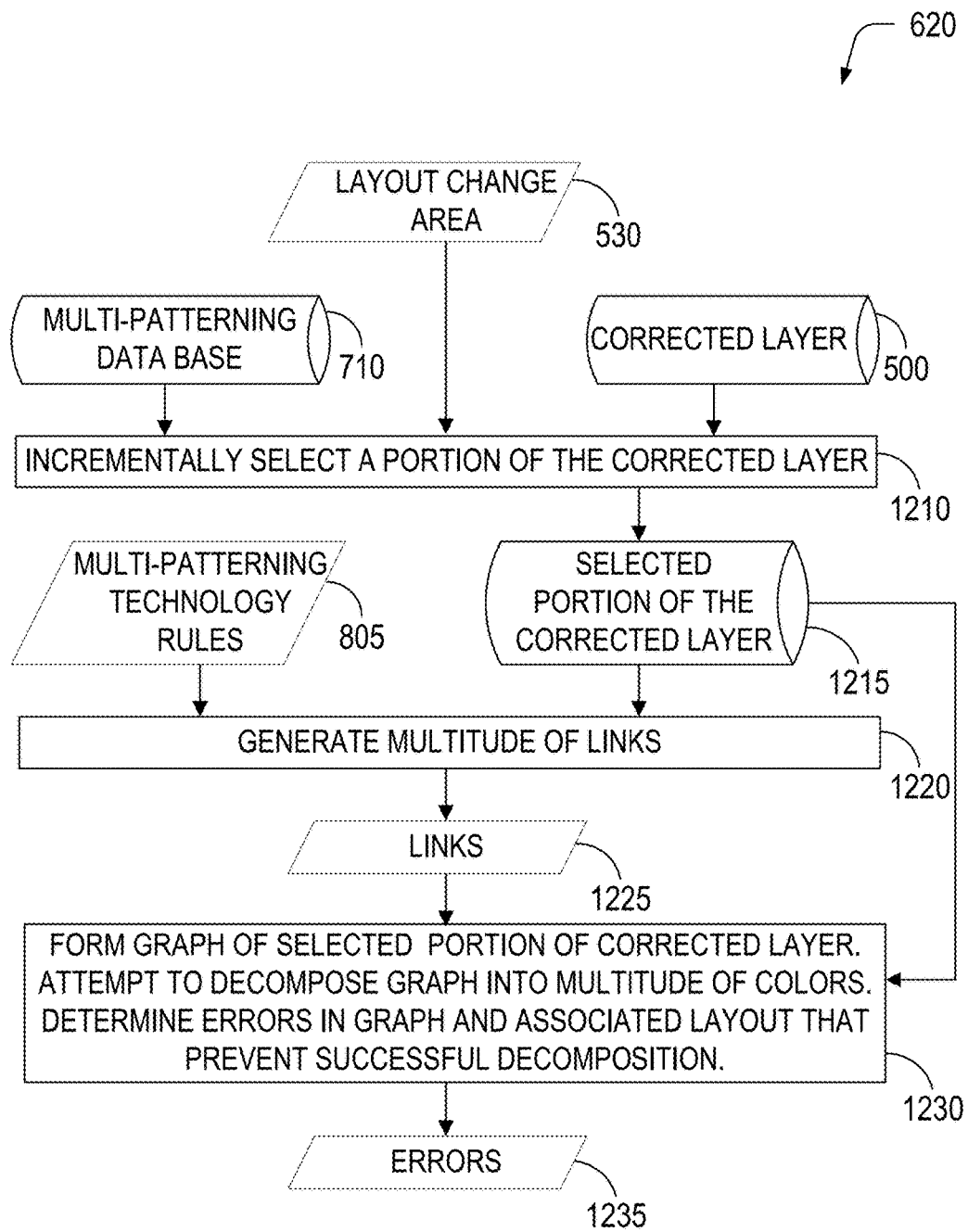
FIG. 12 depicts a simplified exemplary flow chart for the step of incrementally validating a portion of the corrected layer in accordance with the error and a connected component of the new graph associated with the multi-patterning layer depicted in FIG. 7, in accordance with one embodiment of the present invention.

FIG. 12 depicts a simplified exemplary flow chart 620 for the step of incrementally validating 620 a portion (element 1215 referenced below in FIGS. 12-13, 16) of corrected layer 500 in accordance with error 825 and connected component 1105 of graph 1100 associated with multi-patterning layer 300 depicted in FIG. 7, in accordance with one embodiment of the present invention. Flow chart 620 includes using multi-patterning data base 710, layout change area 530, and corrected layer 500 to incrementally select 1210 a portion (element 1215 referenced below in FIGS. 12-13, 16) of corrected layer 500.

Figure 13:
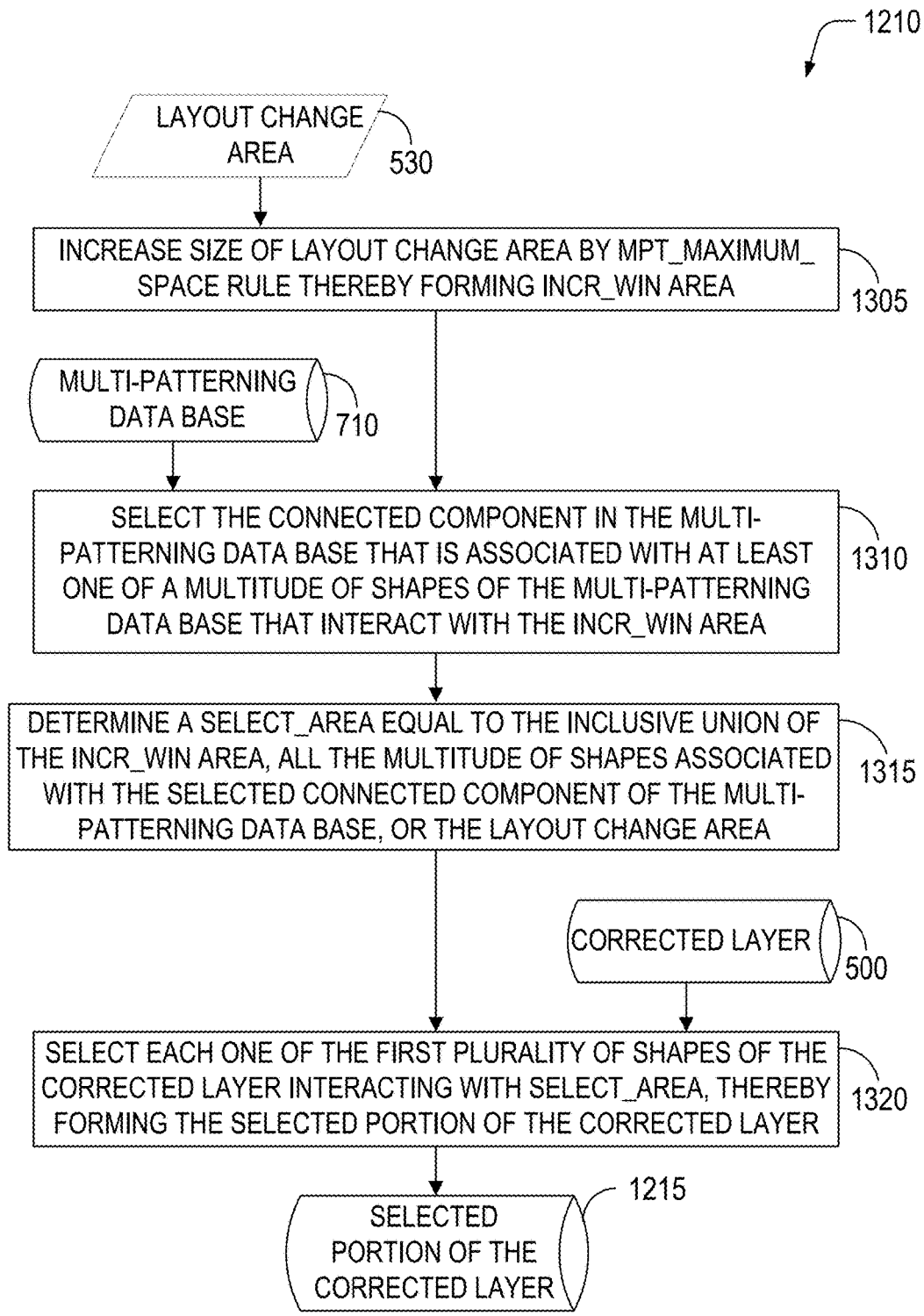
FIG. 13 depicts a simplified exemplary flow chart for incrementally selecting a portion of the corrected layer depicted in FIG. 12, in accordance with one embodiment of the present invention.

FIG. 13 depicts a simplified exemplary flow chart 1210 for incrementally selecting 1210 a portion (element 1215 referenced below in FIGS. 12-13, 16) of corrected layer 500 depicted in FIG. 12, in accordance with one embodiment of the present invention. Referring simultaneously to FIGS. 5 and 13, flow chart 1210 includes increasing 1305 a size of layout change area 530 by the MPT_Maximum_space rule thereby forming an INCR_Win area as depicted in reference to FIG. 14 described below.

Figure 14:
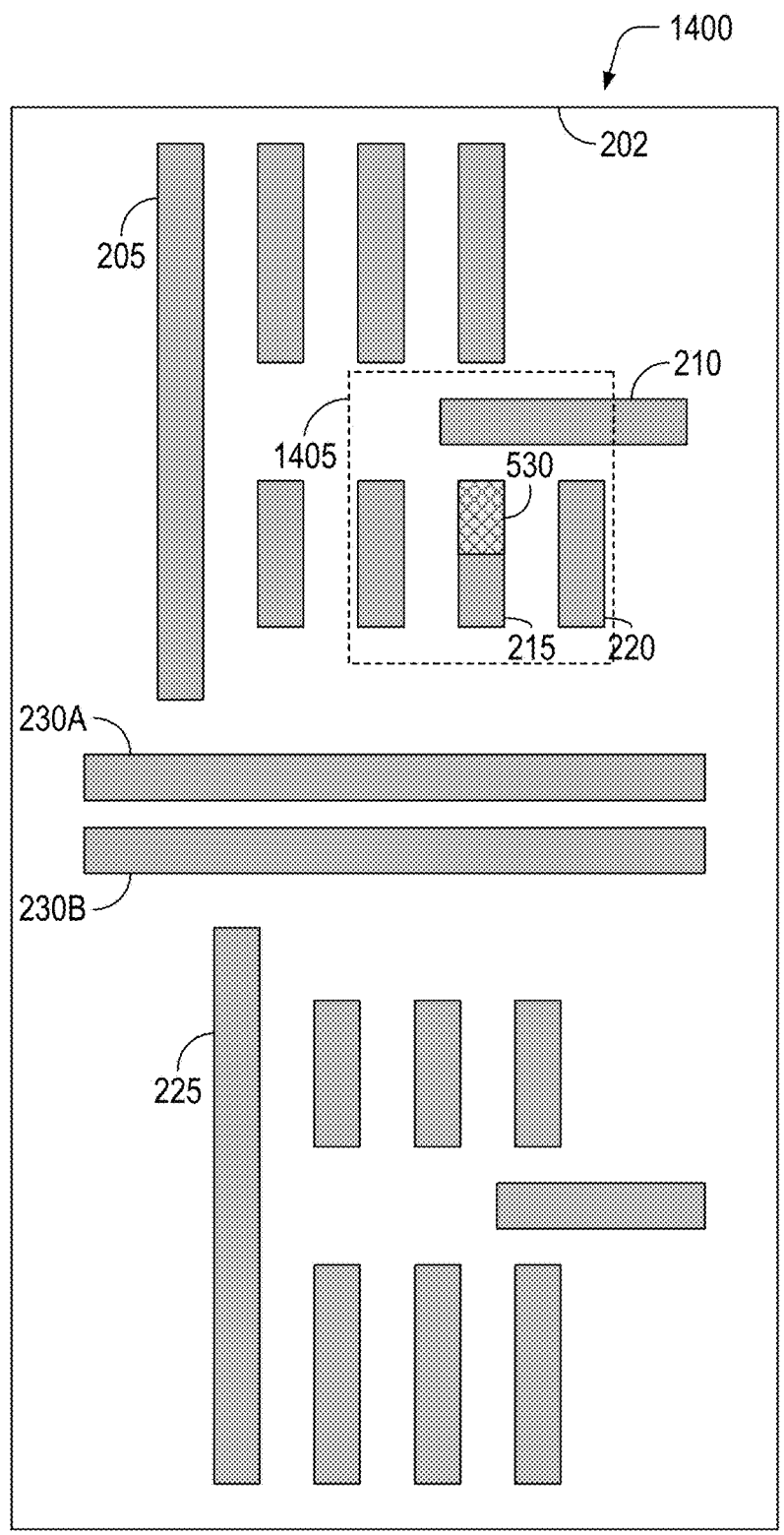
FIG. 14 depicts the simplified exemplary multi-patterning data base after the step of increasing the size of layout change area depicted in FIG. 3, in accordance with one embodiment of the present invention.

FIG. 14 depicts the simplified exemplary multi-patterning data base 1400 after the step of increasing the size of layout change area 530 depicted in FIG. 3, in accordance with one embodiment of the present invention. Multi-patterning data base 1400 includes the same features and functions as multi-patterning data base 710 depicted in FIG. 10 except as described below. Referring simultaneously to FIGS. 5, 10, and 13-14, the size of layout change area 530 is increased on all sides, i.e. "sized," by the value of the MPT_Maximum_space rule, thereby forming an INCR_Win area 1405. Although INCR_Win area 1405 is derived from corrected layer 500 and multi-patterning layer 300, FIG. 14 depicts INCR_Win area 1405 being overlaid with multi-patterning data base 710 for reasons to be explained below.

Referring simultaneously to FIGS. 11, and 13-14, after forming INCR_Win area 1405, flow chart 1210 includes using multi-patterning data base 710, and INCR_Win area 1405 to select 1310 connected component 1105 that is associated with at least one of a multitude of shapes of multi-patterning data base 710 that interact with INCR_Win area 1405, e.g. shape 210. It is noted that the entire connected component 1105 is selected and not just a portion of the connected component.

Figure 15:
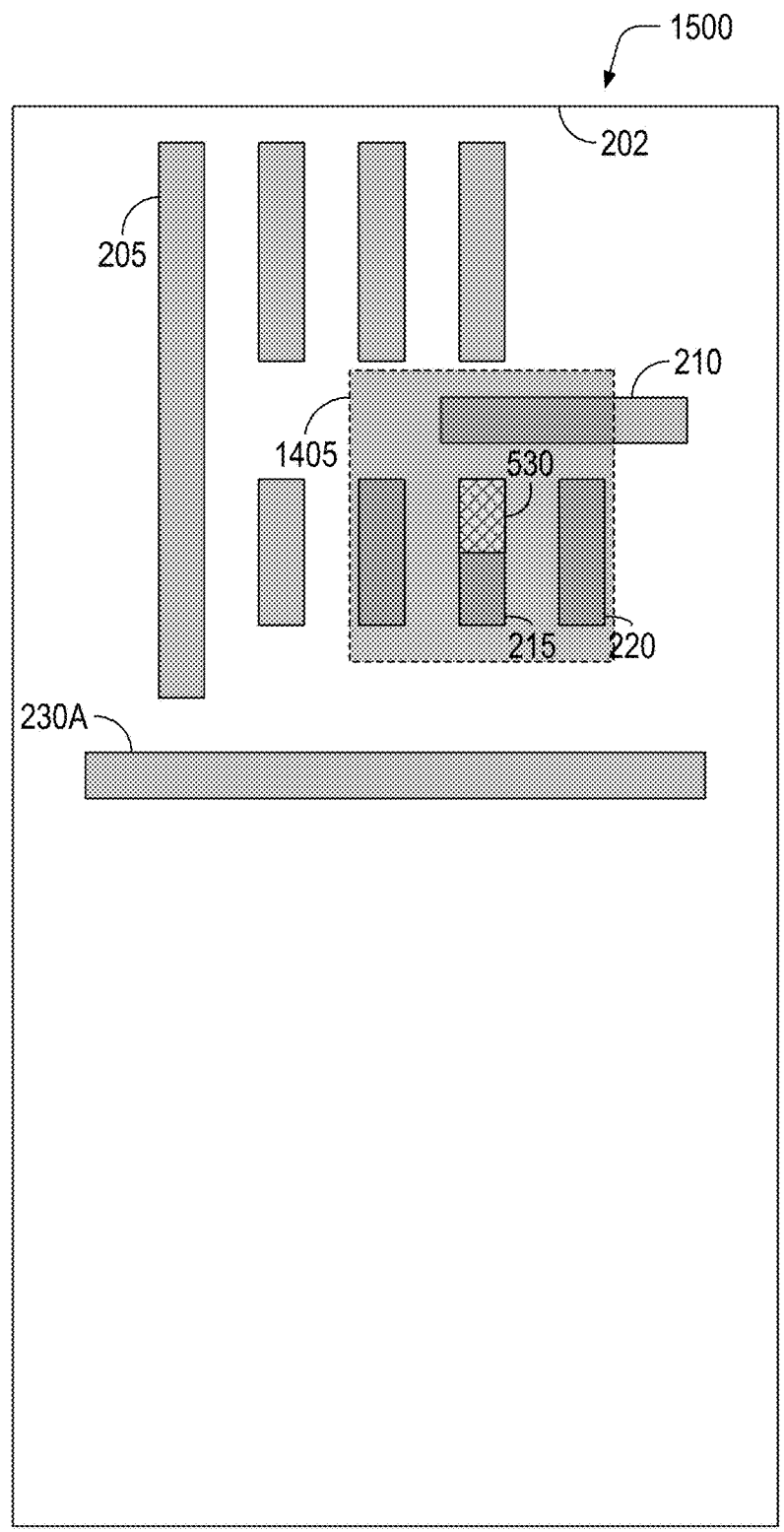
FIG. 15 depicts a select area, in accordance with one embodiment of the present invention.

Next, flow chart 1210 includes determining 1315 a select_area equal to the inclusive union of INCR_Win area 1405, all the multitude of shapes associated with selected connected component 1105 of multi-patterning data base 710, or layout change area 530. FIG. 15 depicts a select_area 1500 (depicted in grey fill pattern), in accordance with one embodiment of the present invention. Select_area 1500 includes shapes 205-220, 230A and all the other shapes from multi-patterning data base 710 that are associated with the entire selected connected component 1105. Select_area 1500 further includes layout change area 530 and INCR_Win area 1405.

Figure 16:
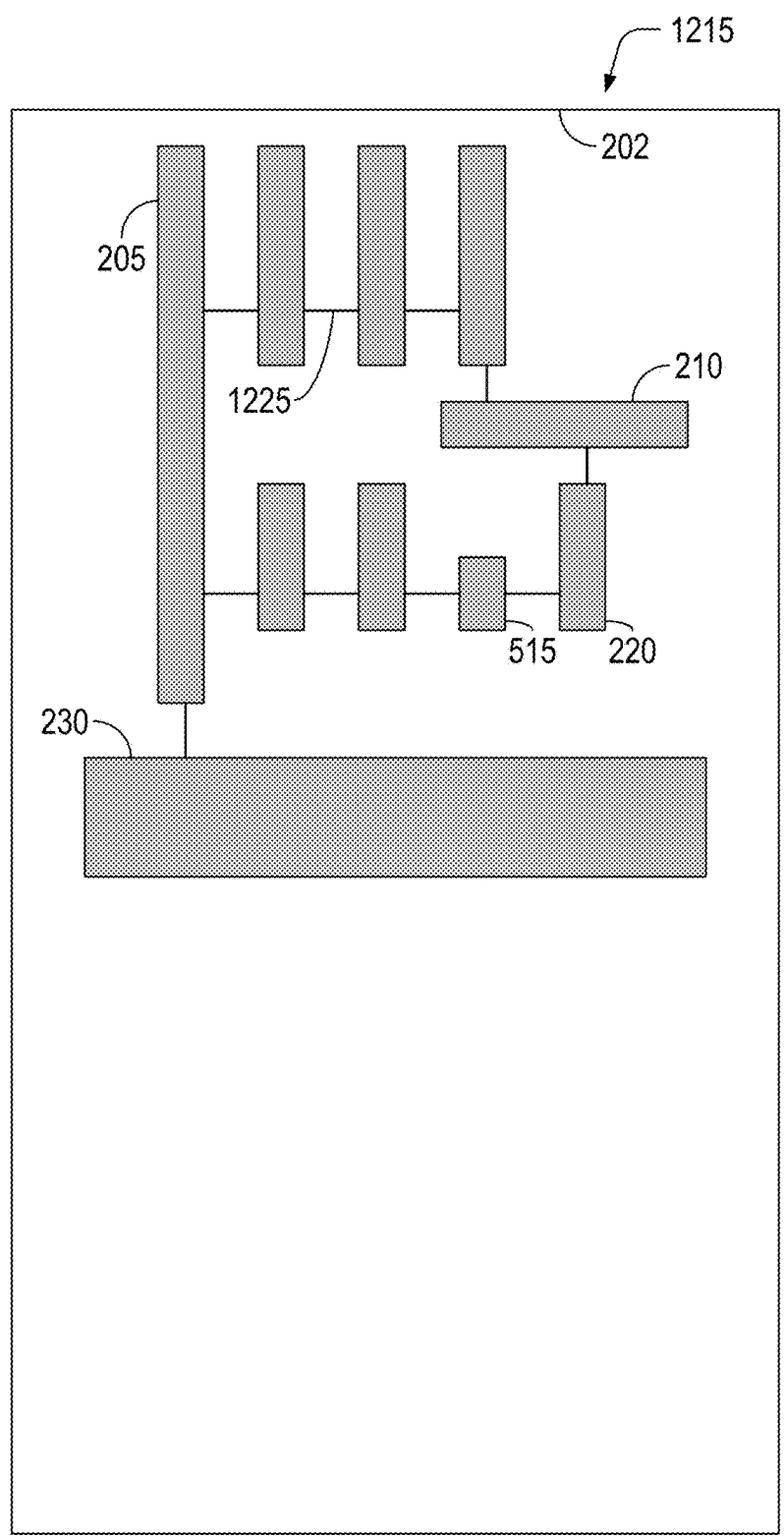
FIG. 16 depicts a selected portion of the corrected layer depicted in FIG. 5, in accordance with one embodiment of the present invention.

Next, flow chart 1210 includes using corrected layer 500 to select 1320 each one of the multitude of shapes of corrected layer 730 interacting with select_area 1500, thereby forming a selected portion 1215 of the corrected layer 500. FIG. 16 depicts a selected portion 1215 of the corrected layer 500 depicted in FIG. 5, in accordance with one embodiment of the present invention. Referring simultaneously to FIGS. 5, and 15-16, selected portion 1215 of the corrected layer 500 includes shapes 205-210, 220-230, 515 and each other shape of corrected layer 500 that interacts with select_area 1500.

Accordingly, none of the shapes associated with connected component 1110 are included in selected portion 1215. In other words, the second validation or revalidating of selected portion 1215 of the corrected layer 500 will be described below without validating an unselected portion of corrected layer 500 associated with connected component 1110. It is noted that at this step in the technique shape 230 is uncut and representative of a portion of corrected layer 500. Further, portion 1215 of the corrected layer 500 represents a simpler set of data that will require fewer computational resources to revalidate in the steps below than revalidating the entire corrected layer 500, while still including all the shapes where other coloring errors may occur because a BCC of the graph was used in the selection process. The technique now returns again to flow chart 620.

Next, referring simultaneously to FIGS. 12 and 16, flow chart 620 next includes generating 1220 a multitude of links 1225 using the multi-patterning technology rules 805 and selected portion 1215 of the corrected layer 500. Then, flow chart 620 includes forming 1230 a graph of selected portion 1215 of corrected layer 500, attempting to decompose the graph into a multitude of colors, and determine errors 1235 in the graph and associated layout shapes that prevent successful decomposition into the MPT colors. For example, it is determined that the remaining loop in selected portion 1215 is an odd cycle and therefore not decomposable into two colors.

FIG. 17 depicts a series of exemplary process cross sections of one double patterning process that may implement the features, aspects, and steps of the methods discussed herein. FIG. 17 is merely illustrative of an embodiment incorporating the present invention and does not limit the scope of the invention as recited in the claims. One of ordinary skill in the art would recognize other variations, modifications, and alternatives.

The embodiments of FIG. 17 are described in U.S. Pat. No. 8,701,056 B1, filed on Sep. 26, 2012, entitled "AUTOMATED REPAIR METHOD AND SYSTEM FOR DOUBLE PATTERNING CONFLICTS" by Paul David Friedberg, et al. and are repeated in part herein. The resolution of a photolithographic pattern transfer process reaches its limit at approximately 40 nm half-pitch. To address this problem, a technique called double patterning can be used to achieve necessary feature density below 40 nm half-pitch. Double patterning or DPT is a technique that uses a double exposure using photoresist to create a pattern in a target layer. For example, FIG. 1A illustrates a first photoresist layer 103 formed on a hard mask layer 102, which in turn is formed on a target (e.g. semiconductor) layer 101, all of which is formed on a substrate 100. In a first exposure, photoresist layer 103 is exposed to a first exposure pattern, which results in a patterned photoresist layer 103P shown in FIG. 1B. In one embodiment, this pattern has a 128 nm pitch, as shown. This first exposure is followed by a first etch into hard mask layer 102, which forms a patterned hard mask layer 102P shown in FIG. 1C. At this point, a second photoresist layer 104 is formed over patterned hard mask layer 102P as shown in FIG. 1D. In a second exposure, photoresist layer 104 is exposed to a second exposure pattern, which results in a patterned photoresist layer 104P shown in FIG. 1E. Note that this pattern also has the same pitch as the first pattern, e.g. 128 nm. This second exposure is followed by a second etch, this time into target layer 101, which forms a patterned target layer 101P 35 shown in FIG. 1F. FIG. 1G shows patterned target layer 101P after removal of the patterned hard mask layer 102P and patterned photoresist layer 104P. Notably, the pitch of patterned target layer 101P is significantly smaller than that of the previous photoresist patterns. In one embodiment, the pitch of patterned target layer 101P is 64 nm.

As shown by FIGS. 1A-1G, using double patterning can allow the manufacture of minimum pitch features that are one half the pitch achievable in present technology not using DPT. Therefore, double patterning is highly desirable to increase feature density in semiconductors. To create patterns 103P and 104P referenced in FIGS. 1A and 1D, each exposure requires a different photomask or mask. In one embodiment the features of photoresist layers 103P, 104P described in U.S. Pat. No. 8,701,056 B1 may be associated respectively with color A, and color B as described herein.

The processing of patterned target layer 101P (FIG. 1F) may be made possible, in-part, because of the improvements in manufacturing provided by the fill shape generation embodiments of the present invention referred to in FIG. 2 through FIG. 17, which may be performed for the design intents and associated shapes used in photoresist mask patterns 103P and 104P referenced in FIGS. 1A and 1D. The patterning of target layer 101P, referenced in FIG. 17, may be associated with the patterning of crystalline silicon fins that may be subsequently used in the fabrication of three dimensional transistors such as fin-FETs or triple-gate FETs requiring smaller pitch than that available using a single mask to pattern the layer. In alternative embodiments, other process flows may be used to analogously form structures such as gates for other types of transistors as well as metal interconnects represented by the multitude of shapes depicted in FIG. 2.

Figure 18:
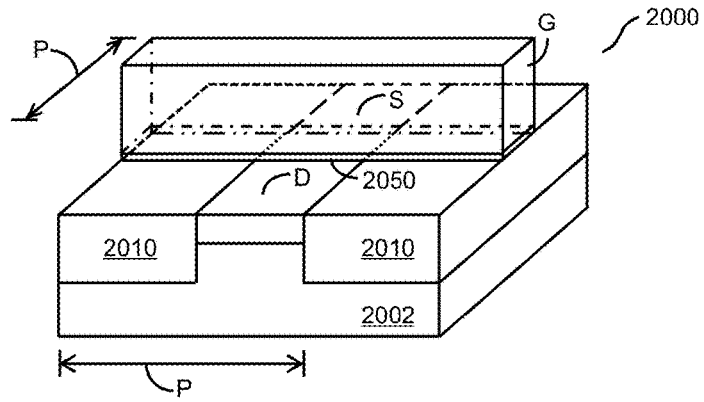
FIG. 18 depicts a simplified exemplary perspective view of an insulated-gate field-effect-transistor (IG-FET).

FIG. 18 depicts a simplified exemplary perspective view of an insulated-gate field-effect-transistor (IG-FET) 2000. IG-FET 2000 may include a crystalline silicon substrate 2002, shallow trench isolation 2010 (STI dielectric) formed on each side of a crystalline silicon pedestal, a gate dielectric 2050 formed between the crystalline silicon pedestal and a gate, G, formed as a stripe running lengthwise in the plane of FIG. 18 and over STI 2010. IG-FET 2000 may further include source S and drain D regions formed by implanting dopant atoms into the crystalline silicon pedestal in self aligned fashion on each side of gate G. The minimum pitch P normally available for the STI/crystalline silicon pedestal and/or the gate patterns is depicted by the arrows. The circuit density achievable is thus limited in-part by pitch P. The power wasted by IG-FET 2000 may be limited by leakage currents between D and S that are not under the control of G and may in aggregate over a multitude of transistors further limit circuit density.

Figure 19:
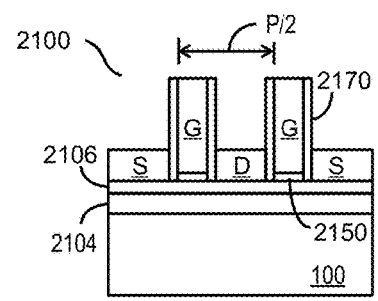
FIG. 19 depicts a simplified exemplary cross-section view of a fully-depleted silicon-on-insulator (FDSOI) FET manufactured using a double patterning process, in accordance with one embodiment of the present invention.

FIG. 19 depicts a simplified exemplary cross-section view of a fully-depleted silicon-on-insulator (FDSOI) FET 2100 manufactured using a double patterning process, in accordance with one embodiment of the present invention. FDSOI FET 2100 may include a starting wafer similar to starting wafer 100 referenced above in FIG. 17 except overlying BOX layer 2104, a crystalline silicon layer 2106 includes a thickness that may be thinner than crystalline silicon layer 101P used for fin-FET manufacture. FDSOI FET 2100 may further include a pair of connected gates G. In accordance with one embodiment of the present invention, the design intent used to form pair of connected gates G may include fill shapes patterned using the double patterning embodiments described herein with a pitch P/2 as depicted by the arrows to increase circuit density and improve manufacturability. In other words, shapes in the design intents referenced in FIG. 2 through FIG. 17 may correspond to shapes used to manufacture a FDSOI FET using a double-patterning manufacturing technology. Pair of connected gates G may have spacers 2170 formed between the gates G and raised doped silicon S and D regions. FDSOI FET 2100 may have reduced leakage characteristics because the silicon channel region immediately below the gates G may be formed thinner using a thin crystalline silicon layer 2106 so as to be fully depleted by the gates G when FDSOI FET 2100 is biased off.

Figure 20:
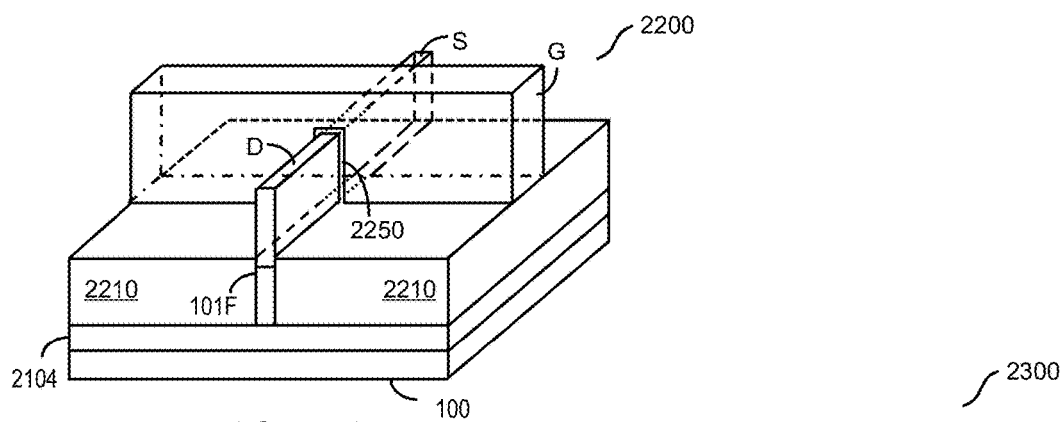
FIG. 20 depicts a simplified exemplary perspective view of a fin-FET transistor.

FIG. 20 depicts a simplified exemplary perspective view of a fin-FET transistor 2200. Fin-FET transistor 2200 may include starting wafer 100 referenced above in FIG. 17, fin 101F patterned similarly as target layer 101P referenced in FIG. 17, STI regions 2210, gate G formed overlaying and surrounding the portion of fin 101F above STI 2210, gate dielectric 2250 between the portion of fin 101F above STI 2210 and gate G, and S and D doped regions in the portion of fin 101F slightly below the surface of STI 2210 and on each side of gate G. The channel region may deplete fully when the gate is biased off because fin 101F is narrow and the gate surrounds the channel on at least two sides. Analogous fin-FET structures may be formed using the starting wafer 100 without BOX processing.

Figure 21:
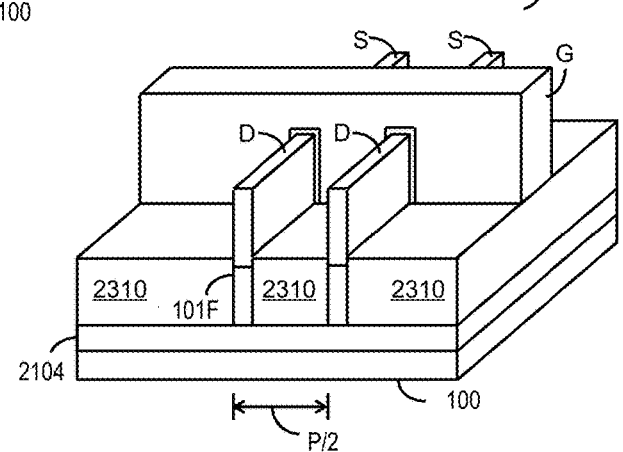
FIG. 21 depicts a simplified exemplary perspective view of a fin-FET transistor manufactured, in part, using the double patterning process depicted in FIG. 17, in accordance with one embodiment of the present invention.

FIG. 21 depicts a simplified exemplary perspective view of a fin-FET transistor 2300 manufactured, in part, using the double patterning process depicted in FIG. 17, in accordance with one embodiment of the present invention. Fin-FET transistor 2300 may include a pair of fins 101F with S and D respectively connected in parallel to form a single FET with double the current drive capability compared to fin-FET transistor 2200. STI 2310 may be formed on each side of the pair of fins 101F. Pair of fins 101F may be manufactured with pitch P/2, as depicted by the arrows, using double patterning technology as depicted in FIG. 17 providing higher circuit density that achievable using single mask patterning technology. The design intent used to form the pair of parallel connected fins 101F may include fill shapes patterned using the double patterning embodiments described herein with a pitch P/2 as depicted by the arrows to increase circuit density and improve manufacturability using embodiments of the present invention referred to in FIG. 2 through FIG. 17. In other words, shapes in the design intents referenced in FIG. 2 through FIG. 17 may correspond to shapes used to manufacture a fin-FET or triple-gate FET using a double-patterning manufacturing technology. Fill shapes using double-patterning may thus be generated and added to masks associated with photolithography patterns 103P, 104P to improve the manufacturability of fins 101P for fin-FET transistor 2300 before the double-patterning wafer process for associated respective photolithography sequences referenced in FIG. 17. It would be understood that BOX processing does not limit the use of target layer 101P, referenced in FIG. 17, for patterning of crystalline silicon fins 101F that may be subsequently used in the fabrication of three dimensional transistors such as fin-FETs or triple-gate FETs.

Figure 22:
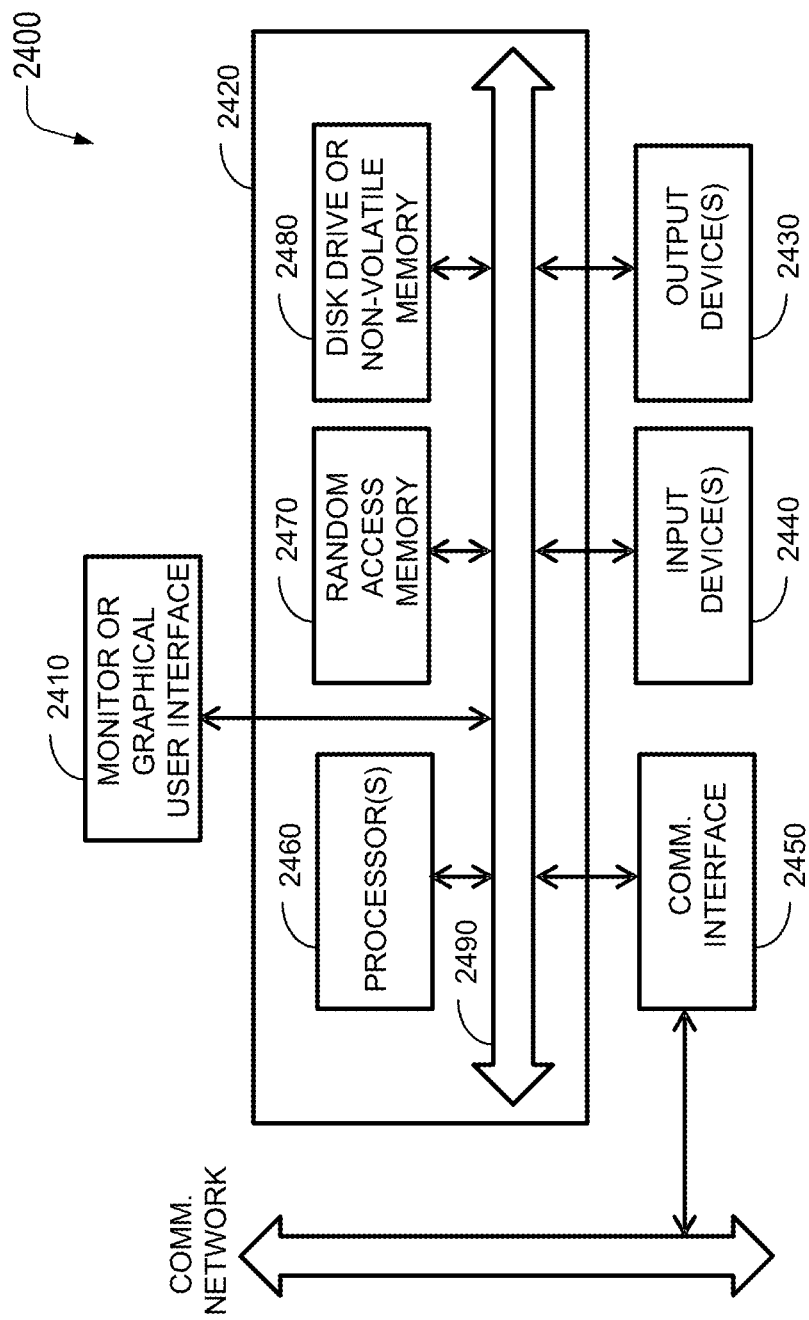
FIG. 22 is a block diagram of a computer system that may implement the features, aspects, and steps of the methods discussed herein.

FIG. 22 is a block diagram of a computer system that may implement the features, aspects, and steps of the methods discussed herein. FIG. 22 is merely illustrative of an embodiment incorporating the present invention and does not limit the scope of the invention as recited in the claims. One of ordinary skill in the art would recognize other variations, modifications, and alternatives.

In one embodiment, computer system 2400 typically includes a monitor 2410, a computer 2420, user output devices 2430, user input devices 2440, communications interface 2450, and the like.

As shown in FIG. 22, computer 2420 may include a processor(s) 2460 that communicates with a number of peripheral devices via a bus subsystem 2490. These peripheral devices may include user output devices 2430, user input devices 2440, communications interface 2450, and a storage subsystem, such as random access memory (RAM) 2470 and disk drive 2480.

User input devices 2430 include all possible types of devices and mechanisms for inputting information to computer system 2420. These may include a keyboard, a keypad, a touch screen incorporated into the display, audio input devices such as voice recognition systems, microphones, and other types of input devices. In various embodiments, user input devices 2430 are typically embodied as a computer mouse, a trackball, a track pad, a joystick, wireless remote, drawing tablet, voice command system, eye tracking system, and the like. User input devices 2430 typically allow a user to select objects, icons, text and the like that appear on the monitor 2410 via a command such as a click of a button or the like.

User output devices 2440 include all possible types of devices and mechanisms for outputting information from computer 2420. These may include a display (e.g., monitor 2410), non-visual displays such as audio output devices, etc.

Communications interface 2450 provides an interface to other communication networks and devices. Communications interface 2450 may serve as an interface for receiving data from and transmitting data to other systems. Embodiments of communications interface 2450 typically include an Ethernet card, a modem (telephone, satellite, cable, ISDN), (asynchronous) digital subscriber line (DSL) unit, FireWire interface, USB interface, and the like. For example, communications interface 2450 may be coupled to a computer network, to a FireWire bus, or the like. In other embodiments, communications interfaces 2450 may be physically integrated on the motherboard of computer 2420, and may be a software program, such as soft DSL, or the like.

In various embodiments, computer system 2400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 2420 includes one or more Xeon microprocessors from Intel as processor(s) 2460. Further, one embodiment, computer 2420 includes a UNIX-based operating system.

RAM 2470 and disk drive 2480 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 2470 and disk drive 2480 may be configured to store the basic programming and data constructs that provide the functionality of the present invention.

The various steps of the methods described herein may be encoded in computer instructions, such as software code modules, stored in a non-transitory computer memory. A processor of a computer system may execute the instructions in order to cause the computer system to perform the method. Software code modules and instructions that provide the functionality of the present invention may be stored, for example, in RAM 2470 and disk drive 2480. These software modules may be executed by processor(s) 2460. RAM 2470 and disk drive 2480 may also provide a repository for storing data used in accordance with the present invention.

RAM 2470 and disk drive 2480 may include a number of memories including a main random access memory (RAM) for storage of instructions and data during program execution and a read only memory (ROM) in which fixed non-transitory instructions are stored. RAM 2470 and disk drive 2480 may include a file storage subsystem providing persistent (non-volatile) storage for program and data files. RAM 2470 and disk drive 2480 may also include removable storage systems, such as removable flash memory.

Bus subsystem 2490 provides a mechanism for letting the various components and subsystems of computer 2420 communicate with each other as intended. Although bus subsystem 2490 is shown schematically as a single bus, alternative embodiments of the bus subsystem may utilize multiple busses.

FIG. 24 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although, the invention has been described with reference to shapes in the form of simple rectangles by way of an example, it is understood that the invention is not limited by the type of shapes but may also be applicable to any shape types including more complicated shapes. Although, the invention has been described with reference to DPT processing, it is understood that the invention is not limited by the number of colors/masks so long as the process may benefit from the use of MPT. In addition, the technique and system of the present invention is suitable for use with a wide variety of electronic design automation (EDA) tools and methodologies for designing, testing, and/or manufacturing systems characterized by a combination of conserved, signal flow, and event or digital system of equations. The scope of the invention should, therefore, be determined not with reference to the above description, but instead should be determined with reference to the pending claims along with their full scope or equivalents.

What is claimed is:

1. A computer-implemented method for validating a design characterized by a multi-patterning layer, the method comprising:
   receiving the multi-patterning layer in a memory of the computer when the computer is invoked to validate the design, wherein the multi-patterning layer includes a first error in a first shape of the multi-patterning layer;
   correcting, using the computer, the first error in accordance with a first rule thereby forming a corrected layer;
   incrementally validating, using the computer, a first portion of the corrected layer in accordance with the first error and a first connected component of a first graph associated with the multi-patterning layer, wherein the first portion includes the corrected first shape, wherein the first graph includes the first connected component, wherein the first portion is associated with the first connected component;
   forming, using the computer, a second graph including the first connected component and a second connected component different from the first connected component;
   selecting, using the computer, the first portion of the corrected layer; and
   validating, using the computer, the selected first portion of the corrected layer without validating a second portion of the corrected layer associated with the second connected component.

2. The computer-implemented method of claim 1, wherein the first error prevents decomposition of the multi-patterning layer into a plurality of colors.

3. The computer-implemented method of claim 1, wherein the first portion includes each one of a first plurality of shapes in the corrected layer associated with the first connected component that includes a first vertex associated with the first shape.

4. The computer-implemented method of claim 1 further comprising:
   cutting, using the computer, a second shape of the multi-patterning layer associated with an articulation point of the first graph thereby forming a second connected component different from the first connected component.

5. The computer-implemented method of claim 4, wherein the second shape is connected to a power or ground line in the design.

6. The computer-implemented method of claim 1, wherein selecting comprises:
   determining a first area associated with a change between the multi-patterning layer and the corrected layer that corrects the first error;
   increasing a size of the first area by a second rule thereby forming a second area;
   selecting the first connected component associated with at least one of a first plurality of shapes of the multi-patterning data base that interact with the second area;
   determining a third area in accordance with the selected first connected component, the first area, and the second area; and
   selecting each one of the second plurality of shapes of the corrected layer that interact with the third area thereby forming the first portion of the corrected layer.

7. The computer-implemented method of claim 1, wherein the first graph is the same as the second graph.

8. The computer-implemented method of claim 1, wherein the first graph is different from the second graph.

9. The computer-implemented method of claim 1, wherein forming the second graph comprises:
   identifying, using the computer, an articulation point of the first graph; and
   cutting, using the computer, a shape of the multi-patterning layer associated with the articulation point thereby forming a second shape associated with the first connected component and a third shape associated with the second connected component.

10. A computer system operative to:
    receive a multi-patterning layer of a design in a memory of the computer when the computer is invoked to validate the design, wherein the multi-patterning layer includes a first error in a first shape of the multi-patterning layer;
    correct the first error in accordance with a first rule thereby forming a corrected layer;
    incrementally validate a first portion of the corrected layer in accordance with the first error and a first connected component of a first graph associated with the multi-patterning layer, wherein the first portion includes the corrected first shape, wherein the first graph includes the first connected component, wherein the first portion is associated with the first connected component
    form a second graph including the first connected component and a second connected component different from the first connected component;
    select the first portion of the corrected layer; and
    validate the selected first portion of the corrected layer without validating a second portion of the corrected layer associated with the second connected component.

11. The computer system of claim 10, wherein the first error prevents decomposition of the multi-patterning layer into a plurality of colors.

12. The computer system of claim 10, wherein the first portion includes each one of a first plurality of shapes in the corrected layer associated with the first connected component that includes a first vertex associated with the first shape.

13. The computer system of claim 10 further operative to:
    cut a second shape of the multi-patterning layer associated with an articulation point of the first graph thereby forming a second connected component different from the first connected component.

14. The computer system of claim 13, wherein the second shape is connected to a power or ground line in the design.

15. The computer system of claim 10 further operative to:
    determine a first area associated with a change between the multi-patterning layer and the corrected layer that corrects the first error;
    increase a size of the first area by a second rule thereby forming a second area;
    select the first connected component associated with at least one of a first plurality of shapes of the multi-patterning data base that interact with the second area;

determine a third area in accordance with the selected first connected component, the first area, and the second area; and select each one of the second plurality of shapes of the corrected layer that interact with the third area thereby forming the first portion of the corrected layer.

16. The computer system of claim 10 further operative to:
identify an articulation point of the first graph; and
cut a shape of the multi-patterning layer associated with the articulation point thereby forming a second shape associated with the first connected component and a third shape associated with the second connected component.

17. A non-transitory computer-readable storage medium comprising instructions, which when executed by a computer, cause the computer to:
receive a multi-patterning layer of a design in a memory of the computer when the computer is invoked to validate the design, wherein the multi-patterning layer includes a first error in a first shape of the multi-patterning layer;
correct the first error in accordance with a first rule thereby forming a corrected layer;
incrementally validate a first portion of the corrected layer in accordance with the first error and a first connected component of a first graph associated with the multi-patterning layer, wherein the first portion includes the corrected first shape, wherein the first graph includes the first connected component, wherein the first portion is associated with the first connected component;
form a second graph including the first connected component and a second connected component different from the first connected component;
select the first portion of the corrected layer; and
validate the selected first portion of the corrected layer without validating a second portion of the corrected layer associated with the second connected component.

18. The non-transitory computer-readable storage medium of claim 17, wherein the first error prevents decomposition of the multi-patterning layer into a plurality of colors.

19. The non-transitory computer-readable storage medium of claim 17, wherein the first portion includes each one of a first plurality of shapes in the corrected layer associated with the first connected component that includes a first vertex associated with the first shape.

20. The non-transitory computer-readable storage medium of claim 17, wherein the instructions further cause the computer to:
cut a second shape of the multi-patterning layer associated with an articulation point of the first graph thereby forming a second connected component different from the first connected component.

21. The non-transitory computer-readable storage medium of claim 20, wherein the second shape is connected to a power or ground line in the design.

22. The non-transitory computer-readable storage medium of claim 17, wherein the instructions further cause the computer to:
determine a first area associated with a change between the multi-patterning layer and the corrected layer that corrects the first error;
increase a size of the first area by a second rule thereby forming a second area;
select the first connected component associated with at least one of a first plurality of shapes of the multi-patterning data base that interact with the second area;
determine a third area in accordance with the selected first connected component, the first area, and the second area; and
select each one of the second plurality of shapes of the corrected layer that interact with the third area thereby forming the first portion of the corrected layer.

23. The non-transitory computer-readable storage medium of claim 17, wherein the instructions further cause the computer to:
identify an articulation point of the first graph; and
cut a shape of the multi-patterning layer associated with the articulation point thereby forming a second shape associated with the first connected component and a third shape associated with the second connected component.

* * * * *